(12) United States Patent
Rotter et al.

(10) Patent No.: US 9,887,995 B2
(45) Date of Patent: Feb. 6, 2018

(54) LOCKING APPLICATIONS AND DEVICES USING SECURE OUT-OF-BAND CHANNELS

(71) Applicant: Ncluud Corporation, Dover, DE (US)

(72) Inventors: Bradley N. Rotter, San Mateo, CA (US); Pavan K. Muddana, Cerrtos, CA (US)

(73) Assignee: CYBERDEADBOLT INC., Dover, DE (US)

( * ) Notice: Subject to any disclaimer, the term of this patent is extended or adjusted under 35 U.S.C. 154(b) by 158 days.

(21) Appl. No.: 15/075,053

(22) Filed: Mar. 18, 2016

(65) Prior Publication Data

US 2016/0277439 A1    Sep. 22, 2016

Related U.S. Application Data

(60) Provisional application No. 62/136,342, filed on Mar. 20, 2015.

(51) Int. Cl.
| | |
|---|---|
| *G06F 21/30* | (2013.01) |
| *H04L 29/06* | (2006.01) |
| *H04W 12/06* | (2009.01) |
| *H04W 12/12* | (2009.01) |

(52) U.S. Cl.
CPC ......... *H04L 63/0861* (2013.01); *H04W 12/06* (2013.01); *H04L 63/1425* (2013.01); *H04W 12/12* (2013.01)

(58) Field of Classification Search
CPC .......... H04L 63/10; H04L 67/30; G06F 21/31
See application file for complete search history.

(56) References Cited

U.S. PATENT DOCUMENTS

| | | | |
|---|---|---|---|
| 2014/0082707 A1* | 3/2014 | Egan | H04L 63/0853 726/5 |
| 2014/0096215 A1* | 4/2014 | Hessler | H04L 63/0869 726/7 |
| 2015/0128240 A1 | 5/2015 | Richards et al. | |
| 2016/0080381 A1* | 3/2016 | Hall | H04L 63/0884 726/7 |

\* cited by examiner

*Primary Examiner* — Izunna Okeke
(74) *Attorney, Agent, or Firm* — Hamilton, Brook, Smith & Reynolds, P.C.

(57) ABSTRACT

Systems and methods are provided for locking/unlocking a user account for accessing a client application. The systems and methods pair a user account for accessing a client application to a separate user authentication account. The user authentication server managing the user authentication account provides heightened measures for authenticating the identity of the user, such as by voice samples and human authenticator. After the heightened authentication of the user, the user may lock or unlock paired accounts from the user authentication account, wherein preventing all attempts to access the client application using the paired account. The client application may also capture information regarding login attempts to the paired user account. The captured information may be sent to the authentication server for providing reports of login attempts and generating alerts to automatically lock the paired account in cases of suspicious behavior.

18 Claims, 26 Drawing Sheets

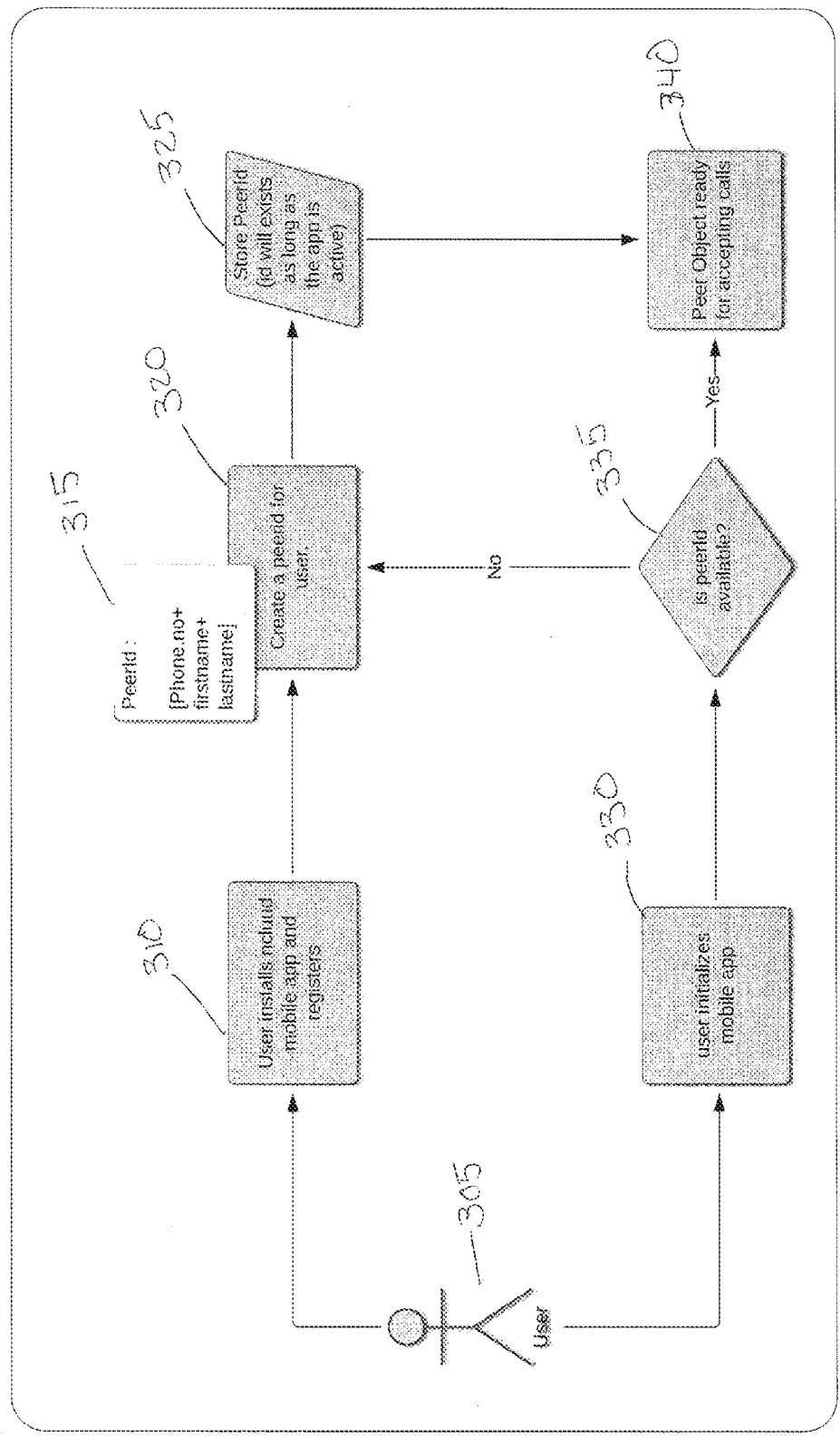

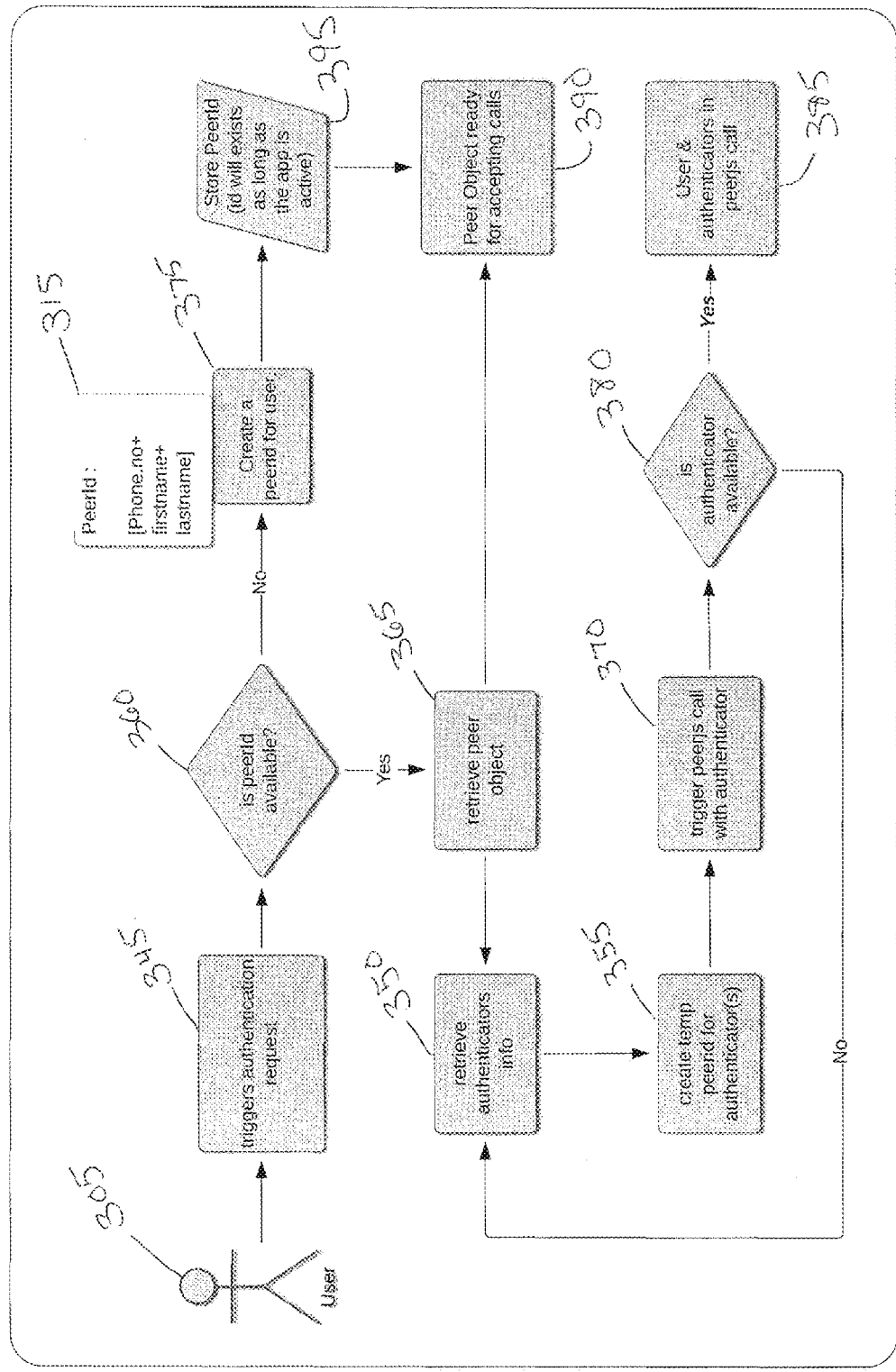

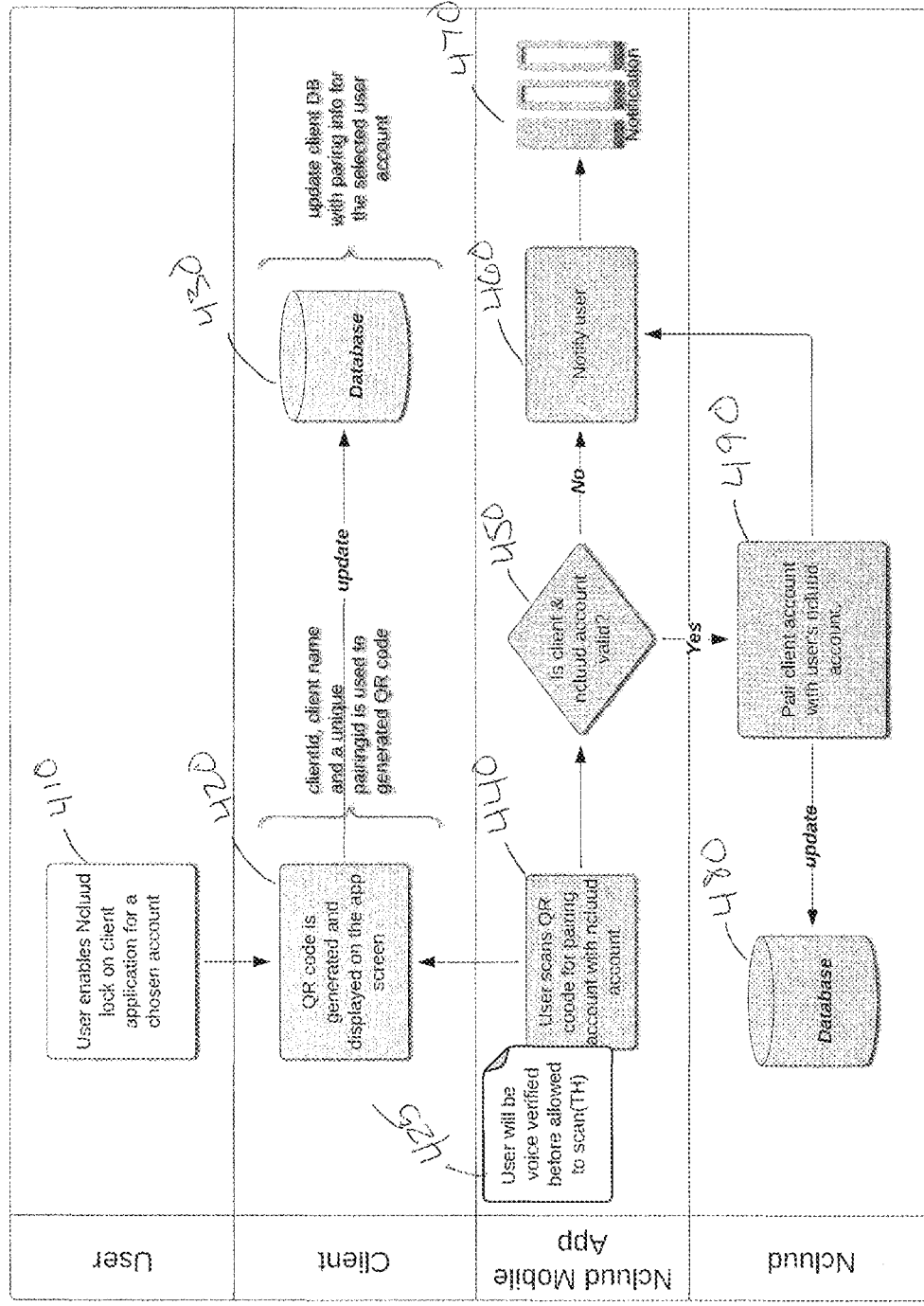

My Accounts

*lasted updated 40 minutes ago*  Settings Logou

Sample Bank

Bank Accounts

Demo User

Account Summary
Available balance $5343.45
Present balance $5220.45
*Enable CyberDeadbolt Lock
Account Status Active

495

Account Summary
Available balance $2320.30
Present balance $2320.30
*Enable CyberDeadbolt Lock
Account Status Active

495

Credit Card Accounts

495

Click to reset account pairings

Account Summary
Current balance $3343.45
Payment due date 03/12/2015
*Enable CyberDeadbolt Lock
Account Status Active

495

Account Summary
Available balance $2320.30
Present balance $2320.30
*Enable CyberDeadbolt Lock
Account Status Active

495

* Enable to lock/unlock account from Cyberdeadbolt mobile app

FIG. 4B

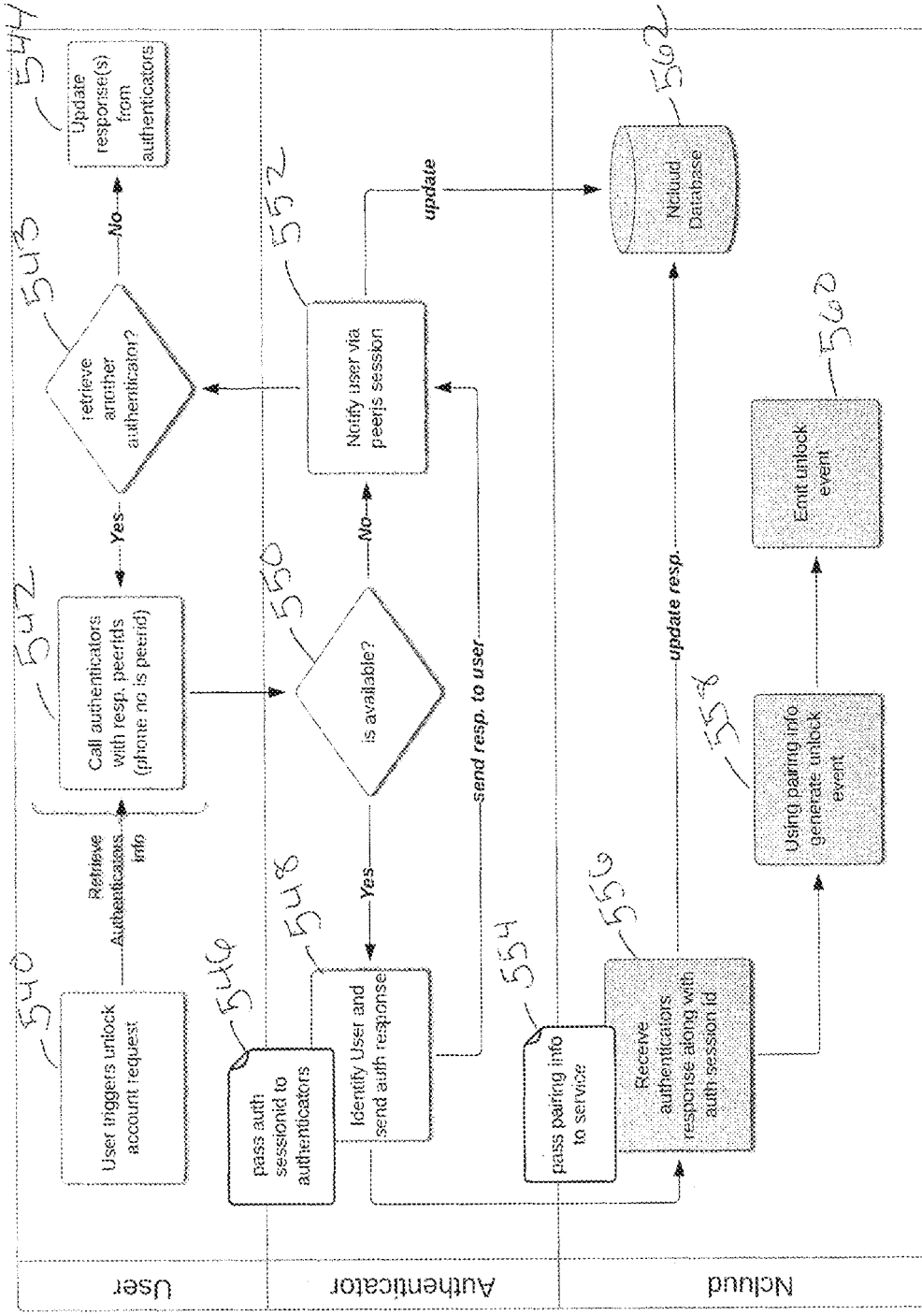

LOCKING APPLICATIONS AND DEVICES USING SECURE OUT-OF-BAND CHANNELS

RELATED APPLICATION

This application claims the benefit of U.S. Provisional Application No. 62/136,342, filed on Mar. 20, 2015, which is herein incorporated by reference in its entirety.

BACKGROUND

Attacks attempting to gain unauthorized access to user accounts, such as a brute force attack repeatedly attempting to log into a user account of a service provider, are common in today's web-based infrastructure. In response, service providers have tried to implement measures to monitor for such attacks and take defensive measures.

SUMMARY OF THE INVENTION

While service providers have developed technologies in an attempt to address such security issues, unfortunately, attacks generally cannot be detected in real-time. Consequently, service providers often cannot detect a valid login attempt from a hacking attempt until after the user account has already been comprised, and the resulting damage already occurred. Further, as cyber attacks increase in number and sophistication, businesses, government, and individual users are weary of dealing with complex and cumbersome authentication system s and methods to secure online accounts and connected services. As such, service providers have few options to prevent such hacking attempts of user accounts.

Some example embodiments of the present invention are directed to systems and methods for combating attempts to gain unauthorized access to client applications (e.g., online services for credit cards, banking, investing, social networking, professional networking, and such) and devices (e.g., mobile phone) from user accounts to dramatically reduce the threat surface. These embodiments provide simple authentication systems and methods that can be used by businesses, government, and individual users to reduce their attack surface and dramatically increase the security of their online accounts, virtual transactions, and anything physical that is connected or enabled to the Internet. These embodiments provide the simple authentication systems and methods by enabling users to pair their client applications (e.g., online services and devices) to an account that the users register (onboard) at an out-of-band authentication server (e.g., a secured virtual authentication server). These systems and methods then leverage the trusted execution environment (TEE) available today on mobile devices to enable a user, in out-of-band channels, via a mobile application installed on the mobile devices, to communicate with the authentication server to automatically or manually lock (deadbolt) or unlock their paired accounts or devices. The present invention also provides a "virtual swiss army knife" of services for the paired accounts for the client applications, which may be used for authenticating the user's account activities in a bespoken fashion.

In an example implementation, a user is allowed to pair a user account for a client application (e.g., online services) to an authentication account that provides heightened methods for authenticating the user, such as using voice samples or human authenticators. Then, through the user authentication account, the user may lock the paired user account for the client application after his/her identity is confirmed using the heightened methods for authenticating the user. Once the paired account is locked (deadbolted), no login attempts may be made to this account, until the user unlocks the paired accounts after going through the same level of heightened authorization. In some embodiments, a more heightened method may be used to authenticate the user for unlocking the paired account than used to authenticate the user for locking the account. In this manner, a user may lock his/her accounts, such as online services for credit cards, banking, investing, social networking, professional networking, utilities, or other such accounts, at times when the user will not be using the accounts, such as at night or while on vacation, to prevent any chance that an unauthorized individual may attempt to log into these accounts. This same process may, for example, be used to protect other client applications, such as wireless routers, mobile phones, security systems, automobiles, wirelessly controlled appliances, or any other such remotely controllable device.

These systems and methods may begin by pairing a user account for a client application (e.g., an online banking service, mobile phone, or such) to a user authentication account. Prior to pairing the accounts, the systems and methods may first generate identification information for the client application for which the user has a login account. In some embodiments, the identification is generated by means of an API installed at the client application for communicating with an authentication server managing the user authentication account. The API may request client information (e.g., client name) from the client application during setup of the user account for the client application, generate a unique client id, generate an encryption key for communication with the authentication server, and provide other initial configurations required for pairing and lock/unlock a user account at the client. In some embodiments, the identification information is saved at the client application and authentication server that manages the user authentication account. In other embodiments, installing the API may generate an option that enables pairing the user account to a user authentication account, and in other embodiments this option may be generated by the client application in communication with the authentication server.

In some embodiments, the user may select the pairing option to start the pairing process to enable locking/unlocking of the user account. The client application may generate a pairing code in response to selecting the pairing option, and the generated pairing code may be comprised of a client name, a client id, and a uniquely generated pairing id. The pairing code may be displayed to the user, and in some embodiments, the pairing code may be displayed to the user in the form of a barcode (e.g., QR code) that may be scanned. Specifically, in some embodiments, pairing may be initially performed by matching the user mobile phone number retrieved from the client application to the user mobile number used while registering with the authentication server. If the numbers match, the user account for the client application may be automatically paired to the user's authentication account, else the QR code is displayed to the user to scan and pair account. The user may then access his/her user authentication account via a user device application communicatively coupled to the authentication server. In some embodiments, the user device application may access the user's authentication account through a trusted execution environment (TEE) configured at the mobile device and authentication server, which may be a secured virtual authentication server. In some embodiments, the user may need to first register and/or log into the user account locking system by communicating with an authentication server to generate an account. In these or other embodiments, the user may also need to first be authenticated by the system by such means as voice samples, biometric information, behavioral information, or authenticators who can identify the user.

After successful authentication, the user may, then, be allowed to select a pairing option through the user device application, or other such means, and the pairing option selection may require additional authentication to confirm the user as the registered user for pairing the account due to the heightened security level of this action. After successful authentication, if required, the system allows the user to provide the pairing code to the user device application, such as scanning the pairing code in the embodiments where the pairing code is in barcode format (e.g., QR code). In some embodiments, the user device application validates the client information contained in the pairing code against the identification information for the client application saved at the authentication server, to confirm the pairing code is for a client subscribed to the account locking system. In response to validating the user, the user device may send the information contained in the pairing code to the authentication server to be stored in the user authentication account and linked to the saved identification information for the client application.

In some embodiments, the user may then change the lock status of the paired user account. The user may access the user authentication account using an authentication application on a user device that displays the user accounts of client applications paired to the user authentication account. The user may select one of the displayed pairings and a corresponding option to change the status of the pairing via the user device application. In response to selection of the pairing, the authentication application running on the user device may authenticate the selector as the registered user of the user authentication account, using various methods that may include voice, biometrics, behavioral, or authenticators. After authenticating the user (if required), the user device sends a request to the authentication server to retrieve client and pairing information stored in relation to the pairing, and generate an event in regards to the changed lock status, the event including the pairing information. In some embodiments, the authentication server stores the changed lock status at an authentication database, and returns the stored lock status to the client application when requested. In other embodiments, in response to the request, the authentication server may transmit the event to each client application identified in the retrieved client information. Each such client application may receive the respective event and change the lock status saved at the client application for the pairing identified in the event. The client application may determine login access to the respective user account of the client application based on the saved lock status stored at the authentication server.

In some embodiments, the client application may be a service provider, wireless router, mobile phone or other mobile device, security system, wireless controlled appliance, a car door, or other such automatically control device. The communication may be transmitted over any data, voice, or video network, including a distributed peer-to-peer decentralized network, in a trusted execution environment in which all the communication between the computing devices and authentication server are encrypted using a uniquely assigned authentication key. In some of these embodiments and other embodiments, the client application monitors the login attempts of a user account and sends the captured data to the authentication server. The authentication server may take action in response to the captured information, such as generating reports of activity or alerts that automatically lock the paired user account.

In some embodiments, the systems and methods include generating a cyberscore assessing the strength of the cybersecurity framework that includes detected security settings configured for the online login accounts for a user, captured login activities of the online login accounts of the user, capturing lock and unlock activities of the online login accounts, and detecting pattern of behavior of the user. The generated cyberscore may be compared to a threshold cyberscore value, which may be used to determine a premium for offering cyber insurance to the user.

In some embodiments, the systems and methods include generating community alerts on security of client application by a group of individuals with login accounts to the client application. In this embodiment, the login account for each individual is paired to a user authentication account registered for the given individual, wherein the user authentication account is configured at an authentication server that supports secured peer-to-peer connections for computing devices. The systems and methods may secure a computing device for each individual to communicate with the authentication server and other secured computing devices of the other individuals over the secure peer-to-peer connections. Then, one of the individuals may generate an event over the secure peer-to-peer connection to each of the other individuals and the authentication server indicating an attack related to the client application. The authentication server may automatically lock the paired login account for each individual based on the generated alert. In some embodiments, the secured computing devices use encrypted WebRTC for peer-to-peer communication over Secure Real-Time Protocol (SRTP), and Datagram Transport Layer Security (DTLS) is used to secure all data transfers between the secured computing devices and the authentication server. In other embodiments, the secured computing devices use a trusted execution environment for peer-to-peer communication. A token or PIN may be generated for authenticating the peer-to-peer communications between the secured computing devices and the authentication server.

In some embodiments the systems and methods may secure physical information stored for a user on a distributed data service system, wherein the user has registered a user account for the distributed data service system. The systems and methods may pair an authentication account configured for the user at an authentication server to the user account for the distributed data service system, wherein the pairing sets the status of the paired user account to lock at the authentication server. The systems and methods may then send a request to the authentication server over a first secured peer-to-peer connection using a secured computing device for the authentication server to change the status of the paired user account to unlock, wherein the authentication server authenticates identity of the user based on information stored at the authentication server. The systems and methods may further send a secured message to the distributed data service system over a second secured peer-to-peer connection using the secured computing device, the secured messaging containing additional physical information to store at the distributed data service system for the paired user account. The systems and methods may transmit a status verification request to the authentication server to determine the status of the paired account for the distributed data service system, wherein storing the additional physical information at the distributed data service system based on receiving an unlock status from the authentication service for the paired account. In some embodiments, the communications use encrypted WebRTC for peer-to-peer communication over Secure Real-Time Protocol (SRTP), and Datagram Transport Layer Security (DTLS) is used to secure all data transfers between the secured computing devices and the authentication server. In other embodiments, the communications use a trusted execution environment for peer-to-peer communication. A token or PIN may be generated for authenticating the peer-to-peer communications between the secured computing devices and the authentication server. The additional physical information may be an additional document, account password, or log to store in the distributed data service system, changes to the physical information stored in the distributed data service system, or changes to configured information in the user account for the in the distributed data service system.

BRIEF DESCRIPTION OF THE DRAWINGS

FIG. 3A is a flow diagram of an example user registration and initialization process according to some embodiments of the invention.

FIG. 3B is a flow diagram of an example user authentication process according to some embodiments of the invention.

FIG. 4A is a flow diagram of an example account pairing process according to some embodiments of the invention.

FIG. 4B is an example interface for selecting to pair a user account according to some embodiments of the invention.

FIG. 5B is a flow diagram of an example account unlocking process according to some embodiments of the invention.

Figure 1A:
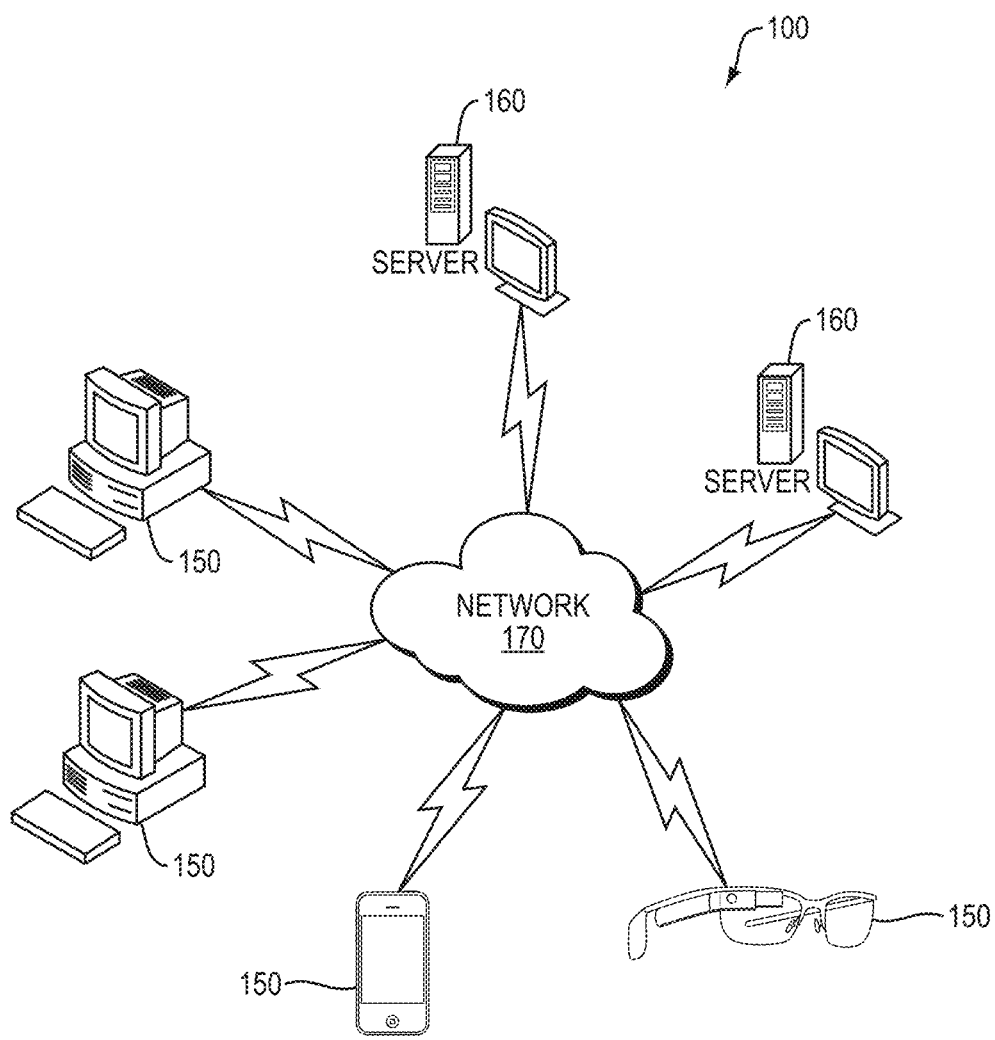
FIG. 1A is a schematic diagram of an example computer network environment in which embodiments of the invention are deployed.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows. The teachings of U.S. patent application Ser. No. 14/530,168, filed Oct. 31, 2014 is herein incorporated by reference in their entirety.

Digital Processing Environment

Example implementation of a user account locking (cyber deadbolt) system 100 (e.g., access management solution) may be implemented in a software, firmware, or hardware environment. FIG. 1A illustrates one such example digital processing environment in which embodiments of the present invention may be implemented. Client computers/devices 150 and server computers/devices 160 (or a cloud network 170) provide processing, storage, and input/output devices executing application programs and the like.

Client computers/devices 150 may be linked directly or through communications network 170 to other computing devices, including other client computers/devices 150 and server computer/devices 160. Server computers/devices 160 may also be similarly linked to other server computers/devices 160. The communication network 170 can be part of a wireless or wired network, remote access network, a global network (i.e. Internet), a worldwide collection of computers, local area or wide area networks, and gateways, routers, and switches that currently use a variety of protocols (e.g. TCP/IP, Bluetooth®, RTM, SRTP, DTLS, WebRTC, etc.) to communicate with one another. The communication network 170 may also be a virtual private network (VPN) or an out-of-band distributed peer-to-peer decentralized network, an example of which is shown in FIG. 1D. As in the environment shown in FIG. 1D, communications may be sent from public network devices 122, 124, with a global IP addresses, over the global Internet 170, and, then, translated to private IP addresses at a bridge, such as an ISP-deployed network address translator (NAT) 126 or home NAT 128 to a private network 130 for secure transmission to private network devices 132,134. The communication network 170 may also provide communication using a private cloud (VPC) protocol between the client computers/devices 150 and server computer/devices 160, each located in a respective private cloud network. The communication network 170 may take a variety of forms, including, but not limited to, a data network, voice network (e.g. land-line, mobile, etc.), audio network, video network, satellite network, radio network, and pager network. Other electronic device/computer networks architectures are also suitable.

Server computers 160 may be configured to provide a user authentication system and customer (client) applications, such as online service provider applications, of the user account locking system 100. The server computers 160 may be configured to pair accounts of the user authentication system to accounts for the customer applications and to lock/unlock the paired customer application accounts to prevent logins into these accounts for accessing protected resources. The server computers 160 may not be separate server computers but part of cloud network 170. The client computers 150 may be configured to perform the pairing and locking/unlocking of the customer application accounts at the sever computers 160 via an application (e.g., mobile application) configured on the client computers 150.

Figure 1B:
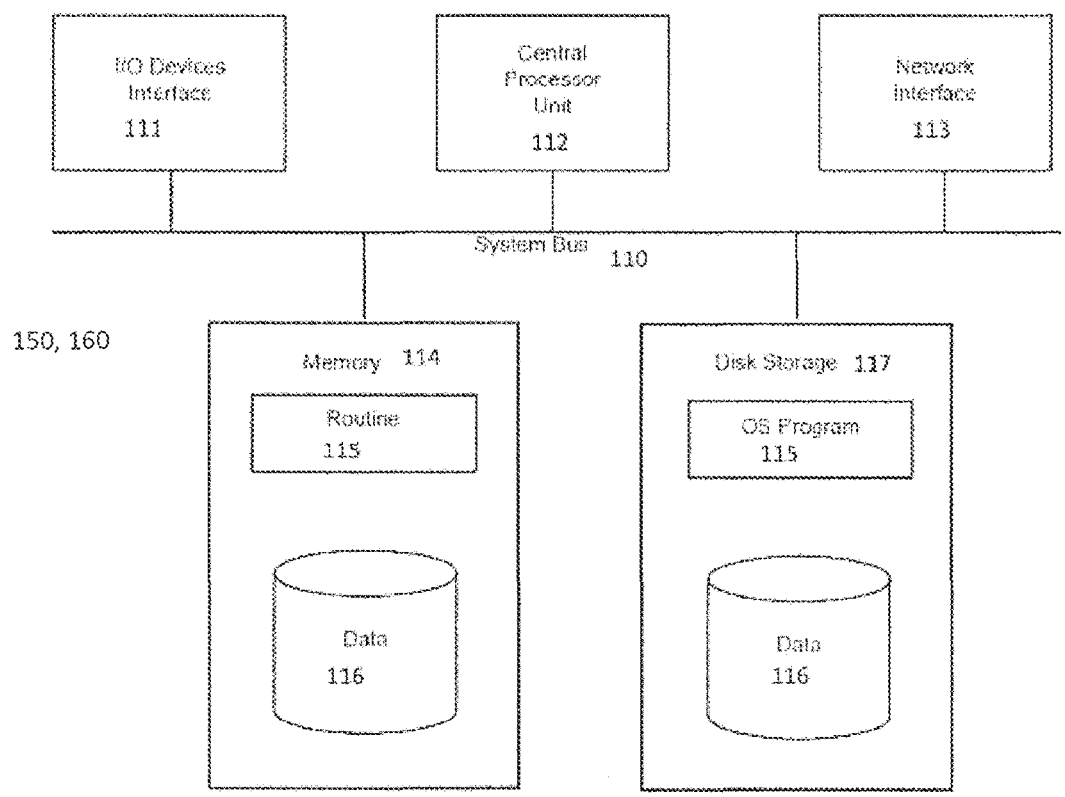
FIG. 1B is a block diagram of certain components of the computer nodes in the network of FIG. 1A.

FIG. 1B is a block diagram of any internal structure of a computer/computing node (e.g., client processor/device 150 or server computers 160) in the processing environment of FIG. 1A, which may be used to facilitate displaying audio, image, video or data signal information. Each computer 150, 160 in FIG. 1B contains a system bus 110, where a bus is a set of actual or virtual hardware lines used for data transfer among the components of a computer or processing system. The system bus 110 is essentially a shared conduit that connects different elements of a computer system (e.g., processor, disk storage, memory, input/output ports, etc.) that enables the transfer of data between elements.

Attached to the system bus 110 is an I/O device interface 111 for connecting various input and output devices (e.g., keyboard, mouse, touch screen interface, displays, printers, speakers, audio inputs and outputs, video inputs and outputs, microphone jacks, etc.) to the computer 150, 160. A network interface 113 allows the computer to connect to various other devices attached to a network (for example the network illustrated at 170 of FIG. 1A). Memory 114 provides volatile storage for computer software instructions 115 and data 116 used to implement software implementations of authentication components of the present invention (e.g. an authentication server/engine 240, customer/client application 250, and applications executing on computing device 220 of FIGS. 2A-2B, and, interactive voice response (IVR) system 184 and portal 194 of FIG. 1C. Software components 115, 116 of the user account locking (cyber deadbolt) system 100 described herein may be configured using any programming language, including any high-level, object-oriented programming language.

The server computers 160 may include instances of the authentication server 240 and customer applications 250 (FIGS. 2A-2B), which can be implemented as a client that communicates to the server 160 utilizing encrypted data packets (e.g. via SSL). The server computers 160 may store pairing information and lock status configured by a user of a computing device 150 based on, for example, pairing a user account for the client applications 250 with the user authentication account managed by the authentication server 240, or store lock status of the paired user account for a client application 250. In addition, the system may include other instances of client processes executing on other client computers/devices 150, such as a client application that may communicate with the server computers 160 to send a lock status change request and to receiving reporting data from the server computers 160 monitoring the paired user accounts. In some embodiments, the computing device 150 identification may be implemented via a software embodiment and may operate, at least partially, within a browser session. In further web-based or app based example implementations, a request to authenticate a user to change lock status may be received via computing device 220 (an instance of client computers/devices 150), stored via an authentication agent/engine 240 and processed via customer applications 250 (instance of server computers 160), as discussed in reference to FIGS. 2A-2B.

In an example mobile implementation, a mobile agent implementation of the invention may be provided. A client-server environment can be used to enable mobile security services using the application server 190 of FIG. 1C. It can use, for example, the XMPP protocol to tether a device authentication server 115 on the client device 150 to a server device 160. The server device 160 can then issue commands to the mobile phone on request. The mobile user interface framework to access certain components of the system 100 may be based on XHP, Javelin and WURFL. In another example mobile implementation for OS X, iOS, and Android operating systems and their respective APIs, Cocoa and Cocoa Touch, and Twilio may be used to implement the client side components 115 using Objective-C, JAVA, or any other high-level programming language that adds Smalltalk-style messaging to the C programming language.

Disk storage 117 provides non-volatile storage for computer software instructions 115 (equivalently "OS program") and data 116 used to implement embodiments of the system 100. The system may include disk storage accessible to the server computer 160 (e.g., authentication database 245 and application database 255 of FIG. 2B). The server computer 160 can maintain secure access to records related to the client applications, pairing information (e.g., pairing identifier), and lock status for the paired user accounts with the system 100. Central processor unit 112 is also attached to the system bus 110 and provides for the execution of computer instructions.

In an example embodiment, the processor routines 115 and data 116 are computer program products. For example, if aspects of the system 100 include both server side and client side components. In one example implementation of the system 100, an interactive voice response system (IVR) and related components, as in FIG. 1C, may be used to send messages to authenticators/attesters who have been selected to attest to the identity of a user, or perform voice based authentication (e.g., using Trade Harbor voice services). In another example implementation of the system 100, an interactive video system may be used to perform peer-to-peer text, audio, and video authentication (e.g., using WebRTC and such). Computer readable software components of such an IVR system may be implemented, at least in part, in software 115, 116. In an example embodiment, authenticators/attesters may be contacted via instant messaging applications, video conferencing systems, VOW systems, email systems, etc., all of which may be implemented, at least in part, in software 115, 116.

In an example embodiment, the authentication server/agent may be implemented as an application program interface (API), executable software component, or integrated component of the OS configured to authenticate users on a Trusted Platform Module (TPM) executing on a computing device 150. For example, all critical communication between the authentication server and a user device (e.g., mobile computing devices) may be transmitted using a trusted execution environment (TEE). This communication may include lock/unlocking request, pairing/unpairing requests, and user authentication information for peer-to-peer communication (e.g., peer identifiers and device identifiers, and such). An updated authentication token or PIN may be stored in the TEE environment for communication each time the user identification is confirmed.

Software implementations 115, 116 may be implemented as a computer readable medium capable of being stored on a storage device 117, which provides at least a portion of the software instructions for the system 100. Executing instances of respective software components of the system 100, such as instances of the authentication server, may be implemented as computer program products 115, and can be installed by any suitable software installation procedure, as is well known in the art. In another embodiment, at least a portion of the system software instructions 115 may be downloaded over a cable, communication and/or wireless connection via, for example, a browser SSL session or through an app (whether executed from a mobile or other computing device). In other embodiments, the system 100 software components 115, may be implemented as a computer program propagated signal product embodied on a propagated signal on a propagation medium (e.g. a radio wave, an infrared wave, a laser wave, a sound wave, or an electrical wave propagated over a global network such as the Internet, or other networks. Such carrier medium or signal provides at least a portion of the software instructions for the present user account locking (cyber deadbolt) system 100 of FIG. 2B.

Interactive Voice Response (IVR) System

Figure 1C:
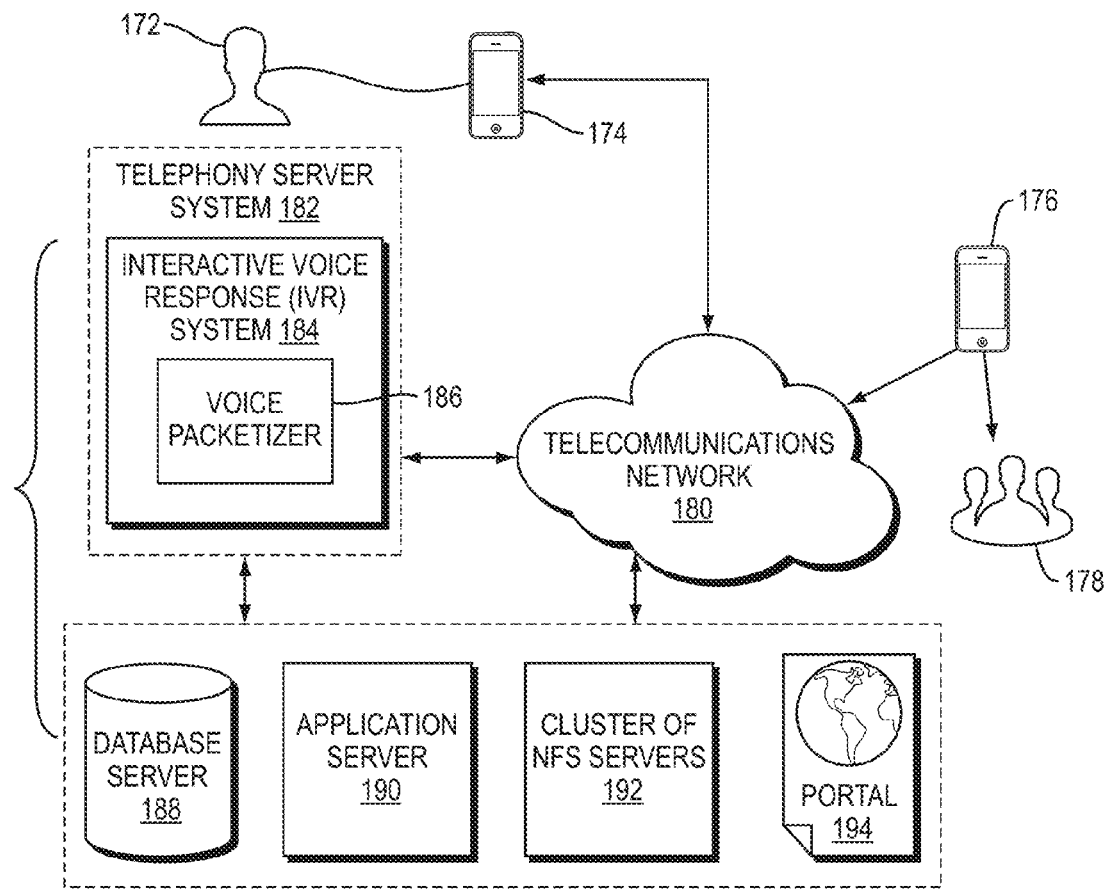
FIG. 1C is a block diagram of the network of FIG. 1A configured in an example embodiment as an interactive voice response (IVR) system according to some embodiments of the invention.
Figure 1D:
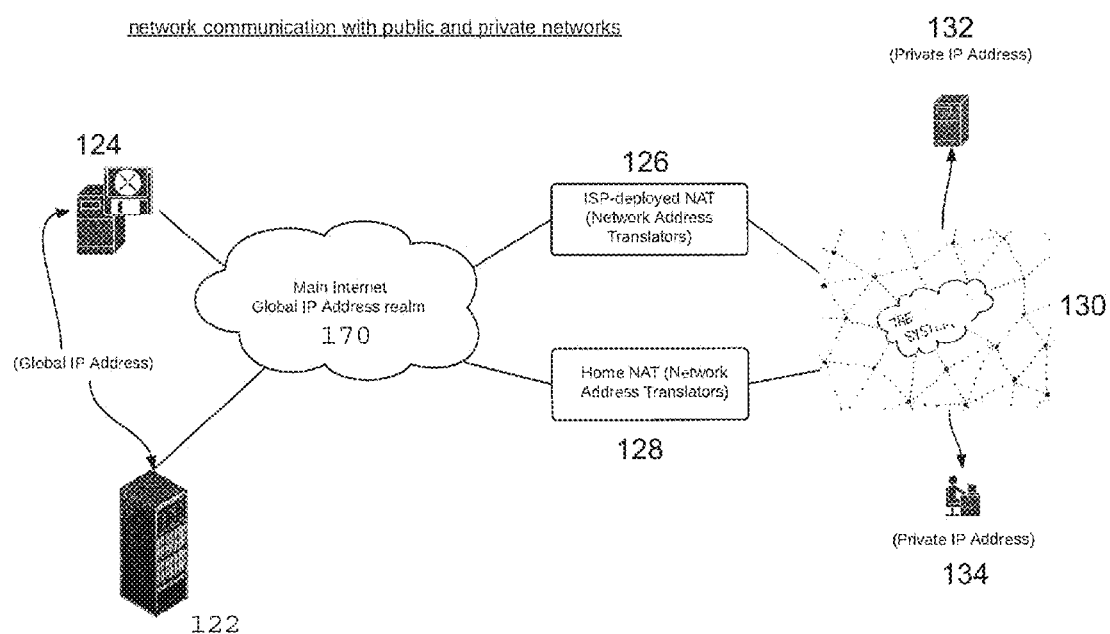
FIG. 1D is a schematic diagram of an example distributed peer-to-peer decentralized network environment in which embodiments of the invention are deployed.

FIG. 1C is a block diagram of an example implementation of certain components of the system 100 of FIG. 1A. In the example configuration in FIG. 1C, an interactive voice response (IVR) system is provided, which may be provided as a standalone IVR. In this embodiment, the user account locking (cyber deadbolt) system 100 is based on interactive voice response (IVR) technology. IVR is a telephony technology in which a user uses a touch-tone phone, speech recognition, or a mobile app to interact with a database to acquire information from the database or to enter data into the database (e.g., via Twilio telephone API and services or such). The requestor 172, by means of a voice device 174 (e.g. mobile phone, landline phone, video phone), may send a request (e.g. make a phone call or send a message) for protected information (e.g. bank account balance) or to pair or change lock status of the associated account. The request may be received by the telephony server system 182 through the telecommunication network 180. The telephony server 182, may access information contained in the request, such as the destination phone number, and based on this information, may respond by prompting the requestor for security information (e.g. username, password, pin code). Once the user enters the security information, the telephony server 182, transfers this information out a port to an application server 190, implemented using a conventional application server computer platform and executing a standard application server operating system that provides for the execution of phone application programs.

The application server 190 may then pass this information to the database server 188 for further processing. The database server 188 may verify that the security information corresponds to an active account and provide this information back to the application server 190. Based on this response, the application server 190 may decide that additional security information may be needed to confirm the identity of the requestor. The application server 190 may request additional information from database server 188 or cluster of NFS servers 192, or may use a portal 194 to collect information from outside networks, such as the Internet.

Using the information received, the application server 190 may request the telephony server system to communicate across the telecommunication network 180 to contact an authenticator 178 by means of voice devices 176 (e.g. mobile phone, landline phone, video phone) to confirm the identity of the requestor. Based on this communication, the authenticator 178, by means of voice device 176, may communicate a response to the telephony server system 182 (e.g. using the device keypad, device app, or speech); the response may confirm or deny the identity of the requestor. The application server 190 may instead request the telephony server system to collect a voice sample from the requestor, such as by prompting the user to speak a word not commonly spoke by the requestor, to confirm the identity of the requestor (e.g., using Trade Harbor voice verification services or such). The telephony server system 182 may transfer the response to the application server 190 for processing and then, based on the response, the application server 190 may instruct the telephony server system to allow the requestor access to the requested information.

The telephony server system 182 may execute a computer telephony integration application that, in combination with the voice packetizer 186, preferably implements the interactive voice response (IVR) system 186 that allows the telephony server system 182 to effectively handle and respond to the voice communications.

Trusted Execution Environment

Figure 2A:
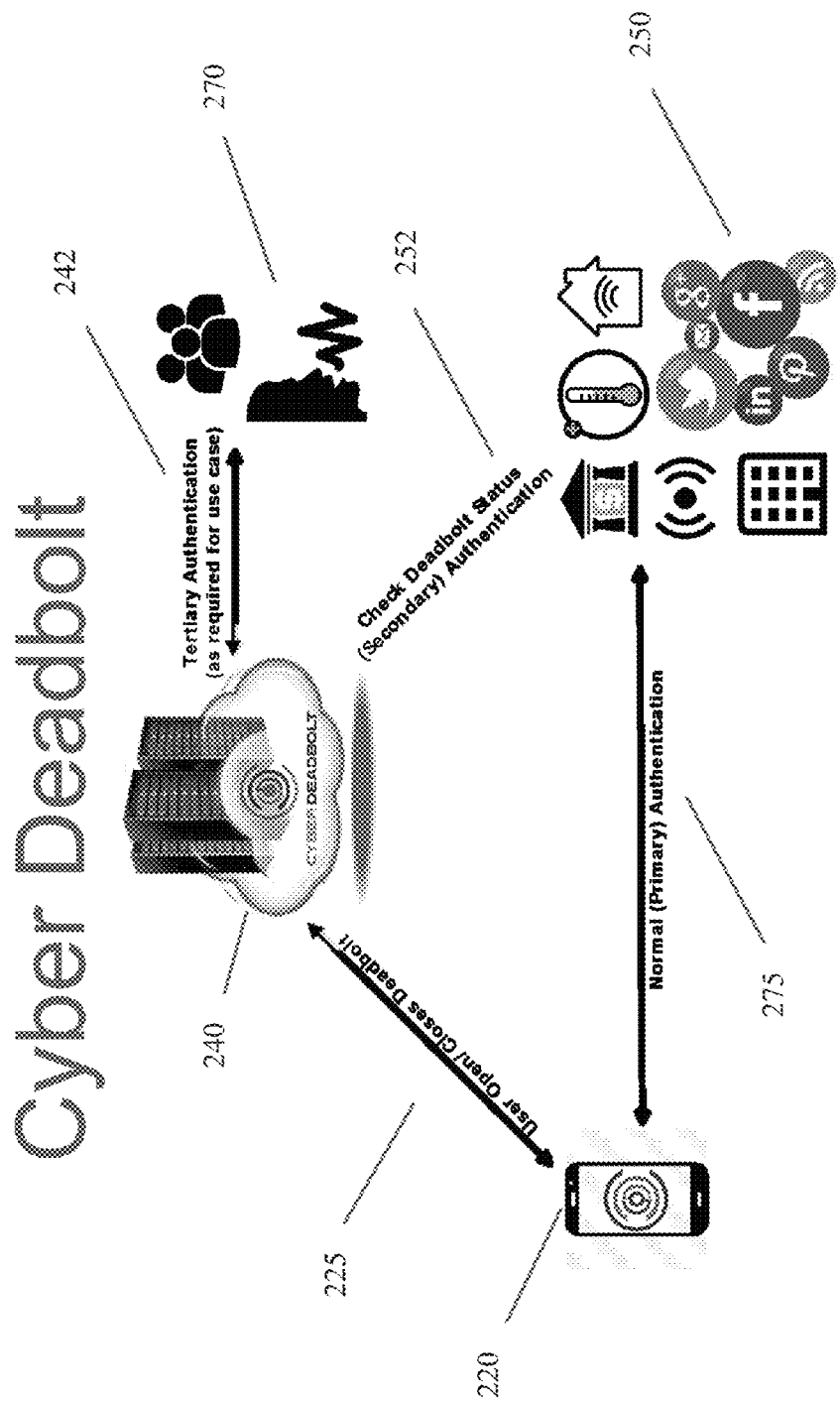
FIG. 2A is a schematic diagram of an overview of an example system for pairing and locking user accounts according to some embodiments of the invention.
Figure 2B:
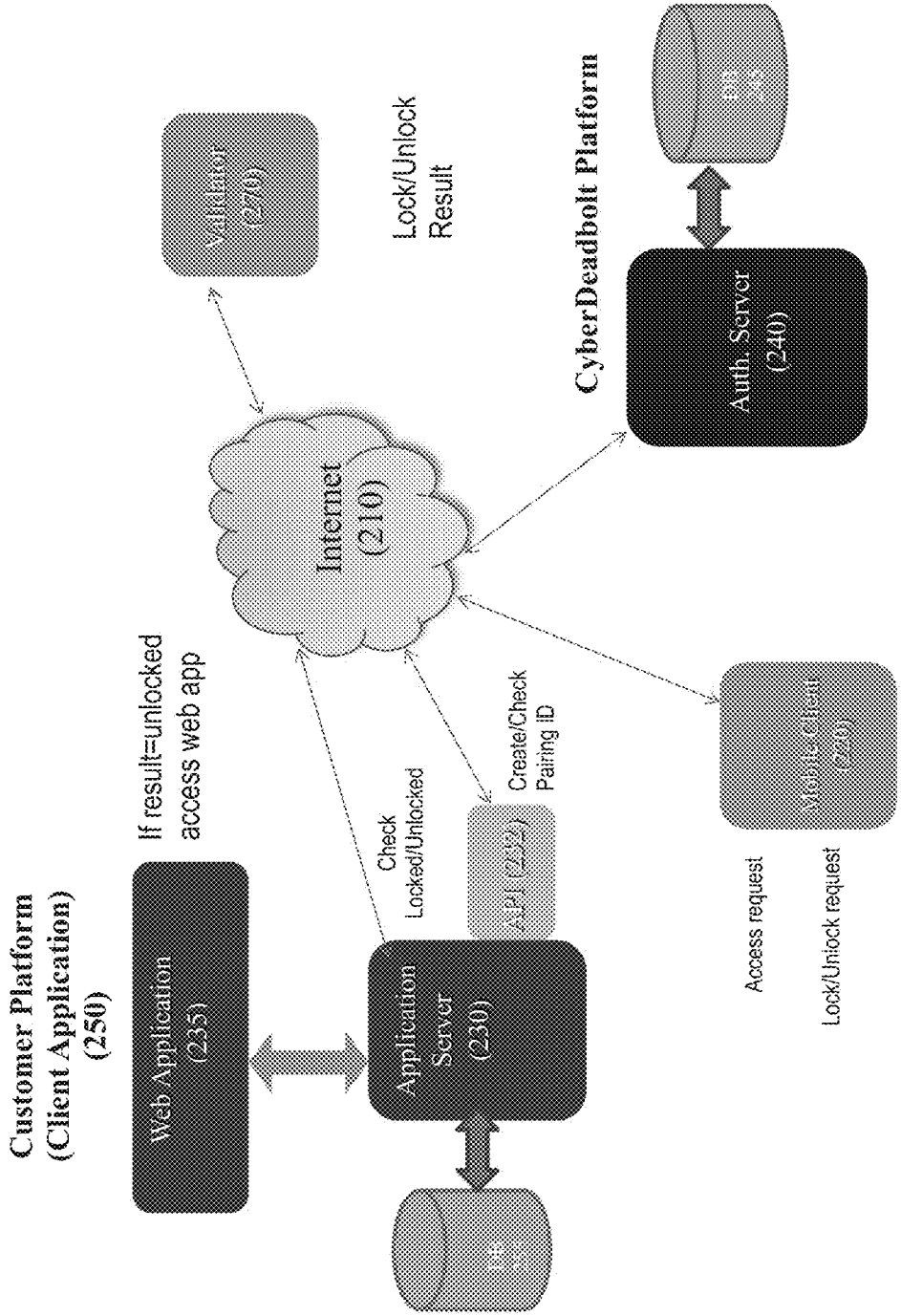
FIG. 2B is a block diagram of the application flow of the example system of FIG. 2A for accessing resources via a paired account according to some embodiments of the invention.

The applications of the present invention (e.g., the application executed on the authentication platform, customer platforms, and computing devices shown in FIGS. 2A-2B) can benefit greatly from strong assurance of their origin and opaque separation from the execution of other applications. This strong assurance may be provided, for example, by configuration of these platforms/devices in a Trusted Execution Environment (TEE). Unlike an application running on the primary operating system (OS) and memory stack, an application running in a TEE has access to cryptographic primitives that can be exercised without snooping by the OS. In ideal circumstances, the application also has direct access to user input and display to ensure a private interaction with the operator of the device.

Both proprietary and standards based solutions in support of device security have worked their way into public and private networks and devices. The Trusted Platform Module (TPM) for instance, is a security chip embedded on the motherboard of most modern PC's. The technology is specified by the Trusted Computing Group (TCG), a non-profit consortium of dozens of major vendors. TPM was designed largely in support of enterprise network security, but also plays a large role in simplifying the consumer web. TPM's have now been shipping for over half a dozen years and are widely prevalent in modern PC's. Microsoft logo compliance beginning in 2015 will further ensure that no machine is delivered without a TPM.

A TPM is relatively simple. It serves three basic purposes: PKI, BIOS integrity, and encryption. While the technology has been pursued for well over a decade, it is only recently that devices with support for a TEE have become available. Intel began delivery of commercial solutions in 2011 and Trustonic launched in 2013. The platforms and associated tools are reaching the level of maturity required for consumer use. Deploying an application into a TEE is akin to delivering a dedicated hardware device. Execution and data are cryptographically isolated from any other function of the host.

Specifically, the chip of the TPM has no identity of its own, but can be programmed to generate key pairs, for example, Attestation Identity Keys (AIKs), which may be marked as "non-migratable" so that the private half of the key pair will never be visible outside the hardware. The TPM configured on the device may post the key pairs to an agent, such as an authentication server of the authentication platform of the present invention, which may hold the key pairs. Then once an application or service registers (e.g., executing on the customer platform, authentication platform, or user computing devices) with the authentication server, the application or service may access the public keys of the device to validate and encrypt communications and cryptographic assurance that the associated attributes emanated from the device. This provides an opportunity to establish a machine identity that cannot be cloned. Currently deployed TPM's, version 1.2, are limited to RSA and SHA-1. Version 2.0, coming soon, will be much more agile. The TPM also implements an Endorsement Key (EK). The EK is installed during manufacture and can be used to prove that the TPM is in a fact a real TPM. A system supporting a TPM will load Platform Configuration Registers (PCR's) during its boot sequence. Beginning with the firmware, each step in the boot process measures its state and the state of the next process and records a PCR value. As the PCR's are captured in the tamperproof TPM a reliable "quote" of the system's BIOS integrity can subsequently be requested. A PCR does not capture what actually happened, it only captures, through a series of hashes that the configuration of the system has not changed. This is particularly important for protection against the most serious, and otherwise undetectable, attacks where a hacker compromises the machine bios or installs a secret hypervisor. Combined with an assurance signature from virus scanning software, one can establish a reliable state of machine health. TPM's also provide bulk encryption services. Encryption keys are generated in the TPM, but not stored there. Instead they are encrypted with a TPM bound Storage Root Key and returned to the requesting process. A process wishing to encrypt or decrypt a set of data will first mount the desired key. The key is then decrypted in the hardware and made available for a ciphering. As with most TPM keys, encryption keys can be further protected with a password if desired.

Trustonic (http:www.trustonic.com) is a joint venture of ARM, G+D and Gemalto. Trustonic provides a trusted execution environment across a broad array of smart devices. The goal is to enable the secure execution of sensitive application services. Trustonic is an implementation of the Global Platform standard for Trusted Execution Environments. Apps written to execute in the Trustonic TEE are signed and measured. Devices supporting Trustonic provide an isolated execution kernel so that a loaded app cannot be spied on by any other process running on the device, including debug operations on a rooted device. Trustonic was formed in 2012 and now ships with half a dozen manufactures and supports a couple dozen service providers. Over 200 million devices have now shipped with Trustonic support.

Intel vPro is collection of technologies built into modern Intel chip set. New machines marketed with vPro support the Intel TXT Trusted Execution Technology. Intel offers a secure processing environment in the Management Engine (ME) that enables protected execution of numerous cryptographic functions. One use of this capability has been the deployment of TPM 2.0 functionality implemented as an app in the ME. The Management Engine also supports secure display functions for conducting fully isolated communications with the user. In this manner an app executing in the ME can take direction from the user with a substantially reduced risk of compromise.

ARM TrustZone provides the silicon foundations that are available on all ARM processors. The primitives isolate a secured world of execution from the common execution space. ARM provides the designs that are then built into a number of standard processors. To take advantage of TrustZone, apps can either be deployed as part of system firmware by the manufacturer or can be delivered after the fact through third party tools like Trustonic, Linaro or Nvidia's open source micro kernel.

Some embodiments of the present invention apply these technologies into a set of services and communications for enhancing the transaction environment that connects the authentication platform, customer platform, and user computing device platforms. For example, using a TPM with the secure source of cryptographic key sets, an application or service can request that a device (e.g., a device of the authentication platform, customer platform, or user's computing device) establishes whether it is the same device previously validated as secured device for transmitting user data between secured platforms. This request may be transparent to the user (or further secured with a PIN) and provides a level of assurance whereby hassling the user for identity and authentication can often be bypassed.

Overview of User Account Locking System

FIG. 2A is a schematic diagram of an overview of an example user account locking (deadbolt) system. In the example system of FIG. 2A, a user first registers (onboards) with the cyber deadbolt authentication server system (at authentication server 240) to setup an authentication account. The user uses an authentication application configured on computing device 220 to communication with the authentication server 240 for providing registration information. The onboarding process includes collecting tertiary authentication information 242 for the user, which may include capturing 270 voice signatures from the user (e.g, using Trade Harbor voice signature technology), capturing biometric or behavioral information from the user (e.g., using Zighra technology), configuring human authenticators (e.g., using human authenticator technology as described in U.S. patent application Ser. No. 14/530,168, filed Oct. 31, 2014, herein incorporated by reference in its entirety), and collecting other security related information from the user provided via the computing device 220. The onboarding process collects the tertiary authentication information 242 in order to confirm the identity of the user during later transactions initiated by a requestor, who may or may not be the user. The user may further configure bespoken procedures for using the configured tertiary authentication information, such as a different procedure being invoked for pairing, locking, and unlocking the user account. The onboarding process may also include contacting the configured human authenticators or other human authenticators, such as individuals indicated as knowing the user via social networking websites or other such resources, to confirm the identity of the user prior to completing the onboarding of the user.

Once the onboarding process is complete at the authentication server 240, in the example system of FIG. 2A, the user may selects to pair an online user account for a client application 250 (e.g., Facebook, PinInterest, Linked In, Google, and such) to the authentication account setup at the authentication server 240. In some embodiments, the client application 250 is configured to communicate with the authentication server 240 (e.g., by an API configured at the client application 250) to pair the user account of the client application 250 to the authentication account configured at the authentication server 240. In some embodiments, the client application 250 provides the user a graphical selection option to select to pair the user account for the client application 250 to the authentication account at the authentication server 240. In these embodiments, by selecting the pairing option, API configured at the client application 250, in communication with the authentication server 240, generates a unique pairing code, which is provided to the authentication server 240 and displayed to the user from the client application 250 (e.g., displayed as a QR code). In some embodiments, pairing may be initially performed by matching the user mobile phone number retrieved from the client application to the user mobile number used while registering with the authentication server. If the numbers match, the user account for the client application may be automatically paired to the user's authentication account, else the QR code is displayed to the user to scan and pair account.

The user further downloads a cyber deadbolt authentication application (e.g., mobile app) on the user's mobile device, or any other computing device 220, which is configured to communicate with the authentication server 240. In some embodiments, this authentication application may be used to perform the above described onboarding process. The authentication application on the user's computing device 220 may enable the user to enter (e.g., scan) the generated pairing code to pair the computing device 220 to the authentication account at the authentication server 240. In some embodiments, the pairing may further comprise the authentication server 240 confirming the identity of the user by various tertiary authentication methods 242, including using the user's captured voice signatures, the user's captured biometric or behavioral information, contacting the configured human authentications for the user, and such, prior to accepting the pairing 270. Note, prior to the downloading of the authentication application, the computing device 220 may be configured as a secured computing device in a trusted execution environment that communicates over an out-of-band network (channels) using chips or other components installed on the computing device to bypass use of the operation system of the computing device 220.

Once the pairing of the user account for the client application 250 to the authentication server 240 is complete, the user may lock/unlock the user account for the client application 250 via the authentication application on the computing device 220. That is, the authentication application on the computing device 220 may include an option for locking/unlocking the user account for paired client application 250. When the user selects this option to lock or unlock the user account for the client application 250, the authentication application on the computing device 220 sends a lock request 225 (i.e., a user closes deadbolt request or a user opens deadbolt request) to the authentication server 240. In some embodiments, the authentication server 240 may then confirm the identity of the user by the tertiary authentication 242 prior to updating the user's status for accessing the user account of the client application 250. Note, a more heightened tertiary authentication 242 may be performed for unlocking the paired user account of the client application 250 (e.g., human authenticators) than for locking the paired user account of the client application 250 (e.g., voice signature). The authentication server 240 then stores the updated deadbolt (lock/unlock status) for the pairing between the user's account for the client application 250 and the authentication server 240.

If the user or other unauthorized requestor attempts to access the user account for the client application 250 via normal (primary) authentication 275, such as using normal username and password login via an application or website loaded at the computing device 220, the API configured at the client application 250 checks the lock/unlock status of the user account for the client application 250. In the embodiments of FIG. 2A, the API sends a request to the authentication server 240 to retrieve/check the current deadbolt (lock/unlock) status 252 of the user's account for the client application 250. The retrieval/checking of the lock/unlock status provides a secondary authentication for the user logging into his/her user account for the client application 250. If the cyber deadbolt authentication server system 240 responds to the request with a lock status, the client application 250 prevents the user or other unauthorized requestor from logging into the user's account for the client application 250. Otherwise, the client application 250 allows the user to proceed to access his/her account for the client application 250 using his/her normal username and password login.

Application Flow of Account Locking System

FIG. 2B is a block diagram of an example application flow of the account locking (cyber deadbolt) system of the present invention. A requestor (which may or may not be the authorized user of the account for the client application 250), by means of an authentication application executing on computing device 220, attempts to log into an online user account for a client application 250 (e.g., bank, credit card company, utilities company, social or professional networking site, mobile phone, wireless device, and such) at a customer platform. Computing device (e.g., mobile device) 220 includes, but is not limited to, any computing or electronic device (e.g. personal computer, client processor, server processor, mainframe, wearable computing device such as Google Glass, laptop, tablet, mobile phone device, personal digital assistant, tablet, Bluetooth device, pager, land-line phone, camera, video camera, or any other network or computing device). The protected resources attempted to be accessed may be assets, purchases, services, content, documents, connectivity, physical devices, or other such resources, and may be accessed through websites, mobile applications, radio, television, ATMs, or any other network accessible medium. The computing device 220, may be attempting to login into the user account at client application 250 to access protected resources (e.g., illicitly withdrawing funds from the bank account). The user account may be a login account for a business, a government, an individual, or any other such entity, and may be a general login account or a privileged login account (e.g., an administrative account).

The client application 250 may receive the request at an application server 230 via an API 232, and using a unique pairing identifier generated for the user account to provide the account locking feature of the present invention, the application server 230 may check in the application database 255 to determine the lock status of the user account. Note, in other embodiments, the application server 230 may generate a request to the authentication server 240 (via the API 232 over Internet 210) with the pairing identifier, which authentication server 240 uses to reference the user's paired authentication account in the authentication server database 245, to return the lock status of the user account to the application server 230. If the status is locked, the application server 230 may respond to the computing device 220 that the user account is locked from access, and the computing device 220 may report to the requestor that the requestor may not log into the system from the web application 235. If the status is unlocked, the application server 230 may respond to the computing device 220 that the user account is unlocked for access, and the application server 230 may allow the requestor to normally attempt to log into the user account (e.g., via username and password) to access the resources from the web application 235. The requestor, if actually the true registered user of the user account, may also change the lock status of the user account for the client application 250 by means of the paired user authentication account as described below in regards to FIGS. 5A and 5B.

Setting Up Client Application

Figure 2C:
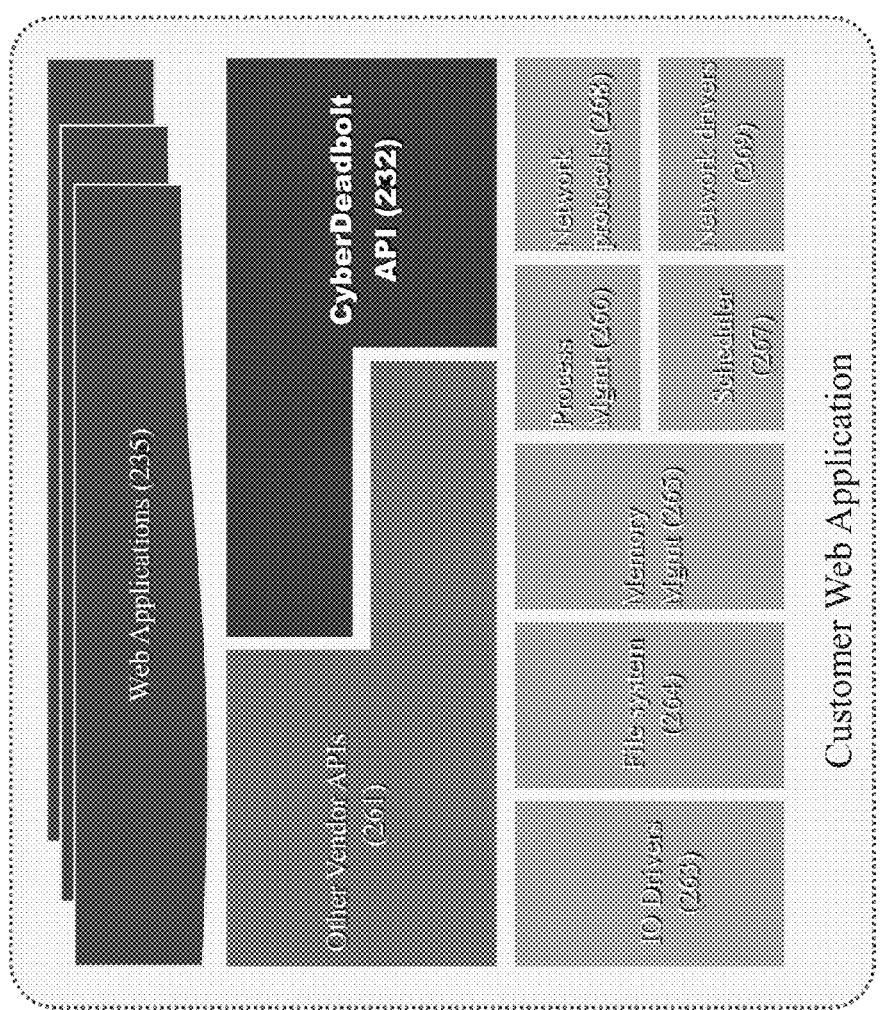
FIG. 2C is a block diagram of the software architecture configured for providing the communications illustrated in FIG. 2B.

Prior to the use of the user account locking system, the system must be setup at the client application 250 for access by the computing device 220. In the embodiment described in FIG. 2B, the client application 250, by means of the application server 230, must register with the authentication server 240 before a user accounts for the client application 250 may be paired with a user authentication accounts managed by the authentication server 240. In some embodiments, the application server 230 may be provided with a client application programming interface (API), such as a JAVA plugin or service, such as shown in Appendix A. As shown in FIG. 2C the API may be configured at the application server 230 (or other component of client application 250, such as the web application 235) to interface with the web application 235, other vendor APIs 261, and other operating system, application, and driver components of the client application 250, such as the IO drivers 263, file system 264, memory management 265, process management 266, scheduler 267, network protocols 268, and network drivers 269. The API 232 may be configured at the application server 230 to integrate the client application 250 to the authentication service 240 for client application communication, such as subscribing to the authentication server 240, pairing user accounts for the client application 250 to the authentication server 240, and retrieving lock/unlock status of the user accounts from the authentication server 240. For example, see the subscribe function of Appendix A for an embodiment of the API 232 that integrates the application server 230 to the authentication server 240 for subscription activities. Note, in some embodiments, the client API 232 is containerized (e.g., dockerized in accordance with the docker platform or the like), such that the client API 232 is converted to execute as one or more processes within a container independent from, but co-existing with, the processes of the client application 250. The containerizing also enables the client API 232 to be portably executable on different application platforms.

As part of the subscribe function, the client API 232 may also collect client data, such as the client name and a unique client identifier, and may transmit the information as part of the subscribe request to the authentication server 240 to be stored in the associated authentication server database 245. In some embodiments, the communication between the client application 250 and the authentication server 240 may be transmitted as a peer-to-peer communication using a trusted execution environment (TEE). In other embodiments, the communication may be transmitted as another peer-to-peer communication (e.g., using WebRTC) over the Secure Real-Time Protocol (SRTP), and the Datagram Transport Layer Security (DTLS) is used to secure all data transfers between the peers. In these embodiments, a unique peer identifier is assigned to each of the components of the client application 250 and authentication server 240 configured for the peer-to-peer channel. In other embodiments, the subscribe request, including client information, may be transmitted to the authentication server 240 using other standard software applications and protocols in which both the client application 250 and authentication server 240 are configured for secure communication.

Further, in some embodiments, the API 232 may be hosted remotely at the authentications sever 240 or at a cloud server, and the subscribe request of the client API 232 is executed via virtual private cloud (VPC) protocol providing communication between the authentication 240 and client application 250, each located in a respective private network, rather than being configured at the client application 250. In other embodiments, the user may contact an agent device of the authentication server (e.g., via phone, email, twitter/tweet, text message, and such) to subscribe, or otherwise perform authentication actions, to the user account locking system, including having the client information added to the authentication data 245 for the authentication account registered to the user. In embodiments involving transmitting the client data, the data may be transferred over any network configuration, including a distributed peer-to-peer decentralized network as shown in FIG. 1D.

As part of the subscription function, a unique encryption key may also be generated by the client API 232 for use in communicating between the client application 250 and the authentication server 240. All the communication between the client application 250 and authentication server 240 may be fully secured and encrypted using the uniquely assigned authentication key and token/PIN, for example, as part of the trusted execution environment. In some embodiments, a new unique encryption key is generated, and communication data encrypted with the key, every time that the client application 250 (via the client API 232) communicates with the authentication server 240, or vice versa. In other embodiments, the unique encryption key is generated once per session in which the client application 250 sets up a connection with the authentication server 240, or vice versa, for data communication (via the client API 232) between the client application 250 and authentications server 240, and the data is encrypted with that same key for the entire session. Note, the secret encryption data for generating the encryption/decryption keys are not sent or received over the network (e.g., as part of the communication), so as to prevent man in the middle attacks on the communications.

The application server 230 may perform additional setup actions (via API 232) after subscribing to the authentication server 240. For example, the application server 230 may also store the information provided to the authentication server 240 in the client database 255 for referencing in regards to pairing and locking and unlocking a specific user account. The application server 230 may also update the web applications 235 to include an option for pairing a particular user account for the client application 250 with an authentication account configured at the authentication server 240. For example, FIG. 4B shows an "*Enable Cyberbolt Deadbolt Lock" checkbox in the web application display of the "User Account Summary" for a particular user account. In this example, the user may select the checkbox to start the process of pairing the respective user account for the client application 250 to the user's authentication account at the authentication server 240. This is just one example of how a web application 235 may provide the user account locking option to the user, but this option may be provided to the users of the client application 250 in various manners both by the web application 235 displaying the option and by any other contact with the user.

Setting Up Authentication Account

Prior to the use of the user account locking system, a user by means of a computing device 220 must setup an account (i.e., registration and initialization) to onboard with the authentication server 240. The computing device 220 may be configured in a trusted execution environment (TEE) in which all communication to the authentication server 240 are encrypted and a new authentication token or PIN is store for use in the communication each time that the user is authenticated. FIGS. 3A and 3B shows an example embodiment of registering and initializing the user to create a user authentication account at the authentication server 240. The user may first install 310 an authentication application associated with the authentication server 240, for example a mobile application, on the computing device 220. In some embodiments, the installation of the authentication application includes collecting security information from the user, such as biometric or behavioral information (e.g., finger prints) or such. Thus, when an individual later attempts to execute the authentication application on the computing device 220, the authentication application, such as by touching or sliding an icon, button, or other such option presented on the computing device 220, for the authentication application may confirm the individual's identity as the user prior to enabling the authentication application interface to the individual. In this way, even if the individual accesses the user's computing device 220 (e.g., mobile phone), the individual may still not execute the authentication application interface to lock/unlock the user's paired accounts for client applications 250.

The user may then provide registration information using the authentication application, which will be transmitted to the authentication server 240 for creating the user account. As part of registration and initialization process, the user may provide contact information, such as name, email address, phone number, username, passphrase, voice samples, biometric samples, such as fingerprints, information regarding social and professional networking sites in which the user has an account, providing contact information for individuals who can confirm the identity of the user (i.e., human authentictators or validator 270), and other such user identification information. This provided information may be used for authenticating the user when the user attempts to access the user authentication account at the authentication server 240 in the future, or attempts to access features of the user authentication account that requires heightened security, such as pairing a user account or changing the lock status of a user authentication account.

As part of the registration and initializing process, as shown in FIGS. 3A-3B, the authentication server 240 may create a peer identifier (peerid) 320 for identifying the user during an active login session. The peerid may also need to be re-created 320 when the user logs into his/her user authentication account (i.e., re-initializes app) 330 after a certain period of time. That is, if the user logs back into his/her user authentication account (i.e., re-initializes app) 330 before a predetermined period of time, the peerid 315 may still be available 335 from the previous login. In the embodiment shown in FIGS. 3A and 3B, the peerid 315 for a user may contain the user's phone number, first name, and last name, but in other embodiments the peerid may contain various other information related to the user. Once the peerid 315 is created, the peerid 315 may be stored 325 at the computing device 220, along with a Peer Object created containing information for accepting calls 340 from authenticators.

As in the embodiment shown in FIG. 3B, the user may perform an action by means of the authentication application configured on the computing device 220 that triggers an authentication request 345, such as logging into the user authentication account or performing heightened security actions such as pairing with a user account for a client application 250 or changing the lock status of a paired user account. The actions that trigger an authentication request may vary for each user authentication account based on various factors, including the configuration selected by the user. The authentication method for an authentication request may also vary based on the security risk of the associated action and also based on the configuration selected by the user. For example, the user may configured changing the lock status of a paired user account to lock requires the authentication server to perform voice verification (e.g., Trade Harbor voice verification services) while changing to unlock status may require the authentication server to confirm the user's identity by contacting human authenticators.

The trigged authentication request 345 in FIG. 3B initiates the process of confirming the user's identification by contacting authenticators due to the heightened level of the user's related action. This process checks if a peerId 315 has been created for the user session 360. If a peerId 315 has not been created, steps 375 through 390 create the peerId and corresponding Peer Object as described above for FIG. 3A. Once the peerId and Peer Object is created to allow accepting calls from authentictators, the authentication application running on computing devices 220 retrieves the Peer Object 365 and accesses the authenticator information contained in the object 350. The authentication application then creates temporary peerids for an authenticator 355 contained in the peer object, and using the retrieved authenticator information, triggers communication (e.g., phone call) with the authenticator using the peerid to secure and identify the communication with the authenticator 370. The communication may be transmitted over any data, voice, or video network, including a distributed peer-to-peer decentralized network, in a trusted execution environment in which all the communication between the computing devices and authentication server are encrypted using a uniquely assigned authentication key. If the authenticator is available 380, the user and authenticator may be placed in communication using the created peerids 385, and the user may confirm the identity of the user based on the communication.

If the triggered authentication request 345 was based on a user registering or logging into the system, and the authenticator confirms the user's identity, the user may now perform actions in regards to his or her user account. In some embodiments, the user by means of applications running on computing device 220 may now performs actions related to his/her user authentication account. In the embodiment shown in FIG. 3C, these actions may include configuring authenticators, scanning and pairing accounts, generating reports, and editing his/her profile or locking the profile entirely. FIG. 3D further shows the options for selection to modify authenticator information or add a new authenticator. The user is not limited to these option but may perform various additional actions in regards to his/her account, both by means of the same or other applications running on computing device 220 or by other means, such as calling the authentication server 240 request related actions.

Pairing User Accounts for Client Application to Authentication Account

Once the user account locking system is setup at the client application 250 (i.e., the client application 250 has subscribed to the authentication server 240), and once the user has setup and logged into a user authentication account registered with the authentication server 240, such as via the authentication application successfully executed after confirming the user's identify (e.g., fingerprinting the user while the user selects the authentication application icon), the user may remotely pair his/her user account for the client application 250 with his/her user authentication account at the authentication server 240. As shown in FIG. 4A, the user may execute a web client application on computing device 220 to access his/her user account at the client application 250. The application server 230 of the client application 250 may retrieve the user account information from the client database 255 for setting up a session between the web client application and the web application 235 of the client application 250. To setup the session, the user may be prompted by the application server 230 for login information (e.g., username, password, PIN) matching the retrieved user account information. If the information matches, and the session is created, the web application 235 may display one or more user accounts that may be paired to the user's authentication account at the authentication server 240. As part of displaying the user account information to the user, the web application 235 may display a pairing option to the user for the one or more user accounts. In some embodiments, the pairing option may be a checkbox 495 as displayed in FIG. 4B.

If the user selects the pairing option, a pairing code, such as a quick response (QR) code, may be generated by the application server 230 (or web application 235) for display to the user via the client application running on computing device 220. The pairing code may be generated to include general client information and information specific to identifying the particular user account, such as the clientid and client name configured at setup and a pairing id identifying the particular user account for the client application 250. The pairing code may include various other client information and user account information for pairing the user account for the client application 250 to the user authentication account at the authentication server 240. In some embodiments, the client API 232 configured at the client application 250 may be executed to generate the pairing code in response to the user selecting the pairing option. For example, see the generateQR function is Appendix A. The generated pairing code may be provided to the user in various forms, for example in the form of a barcode (e.g., QR code) that can be scanned by a scanning device configured on the computing device 220. In some embodiments, the generated pairing code may then be at least one of stored in the application database 255 associated with the respective user account and communicated to the authentication server 240 to be stored in the authentication server database 245. In some embodiments, pairing may be initially performed by matching the user mobile phone number retrieved from the client application to the user mobile number used while registering with the authentication server. If the numbers match, the user account for the client application may be automatically paired to the user's authentication account, else the QR code is displayed to the user to scan and pair account.

The user via the authentication application configured on computing device 220 may provide the pairing code, such as in barcode form (e.g., QR code), to pair his/her user account at the client application 250 to his/her authentication account at the authentication server 240. To start the pairing process, the user may first select an option to pair the accounts, such as the "Scan and Pair Accounts" option in FIG. 3C, via the authentication application running on computing devices 220. After selecting this option, the authentication application may require additional verification of the user's identity, as the pairing action is considered a heightened security action. In the embodiment of FIG. 4A, the required verification is voice verification 425 which may require the user to speak a word not commonly spoken and verify the speech against a stored sample of the user's voice retrieved from the authentication server 240 (e.g., stored in the authentication server database 245) or perform other digital verification of the user's voice. In other embodiments, authentication may not be required or a different authentication method may be used, such as confirming biometric information (e.g., by means of a finger swiping), performing behavioral and implicit authentication, or by use of human authenticators. Once the user has been authenticated, if required, the user may then be prompted to provide the pairing code, for example scanning the pairing code as a barcode (e.g., QR code) using an authentication application such as the tool shown in FIG. 4C. In other embodiments, the user may just scan or otherwise provide the pairing code without first selecting a pairing option.

Once the pairing code is provided to the authentication application, the information from the code is extracted, such as client information and the pairing identifier. The user may also be prompted to provide a unique name for the pairing. The authentication application may transmit a request to the authentication server 240, including some or all of the extracted client application information, to verify that the client is a subscribed user of the user account locking system 450. The transmission is communicated to the authentication server 240 in a trusted execution environment in which all the communication between the computing devices 220 and authentication server 240 are encrypted using a uniquely assigned authentication key. The authentication server 240 may receive the request, and using the information from the request, check the authentication server database 245 to determine: if the user registered with the authentication server 240, if the client application 250 subscribed with the authentication server 240, and if the received client application information matches the information provided by the client application 250 when subscribing with the authentication server 240. The authentication application may also transmit a request to the authentication server 240 to verify that the user authentication account is valid 450, such as the user authentication account was not locked or suspended since the user last logged into the account. If the authentication server 240 responds that the client application and user authentication account is invalid, the authentication application notifies the user that the pairing request failed 460, 470.

The authentication application may then allow the user another attempt to provide the pairing code (if the failure was due to the client information), deactivate the user login to the user authentication account (if the failure was due to the user account), or various other actions in response to the failure. If the authentication server 240 responds that the authentication account is valid, the authentication client may then send 490 the information from the pairing code, including client information, the pairing identifier, and the pairing name, to the authentication server 240 to be stored 480 in the authentication database 245 as part of the user authentication account. The pairing code information may further be linked to the client information stored 480 in the authentication database 245 for the corresponding client application 250, thereby pairing the user account to the user authentication account. In this embodiment, the newly created pairing is in the default lock status of unlocked, but in other embodiments the pairing may be put directly in the lock status of lock. The embodiment of FIG. 4A describes a particular process for pairing a user account to a user authentication account, but the pairing process is not limited to this embodiments but include any process that similarly generates a pairing code for pairing user accounts to a user authentication account for the purpose of lock/unlock and monitoring/reporting activities for the user accounts.

Figure 5A:
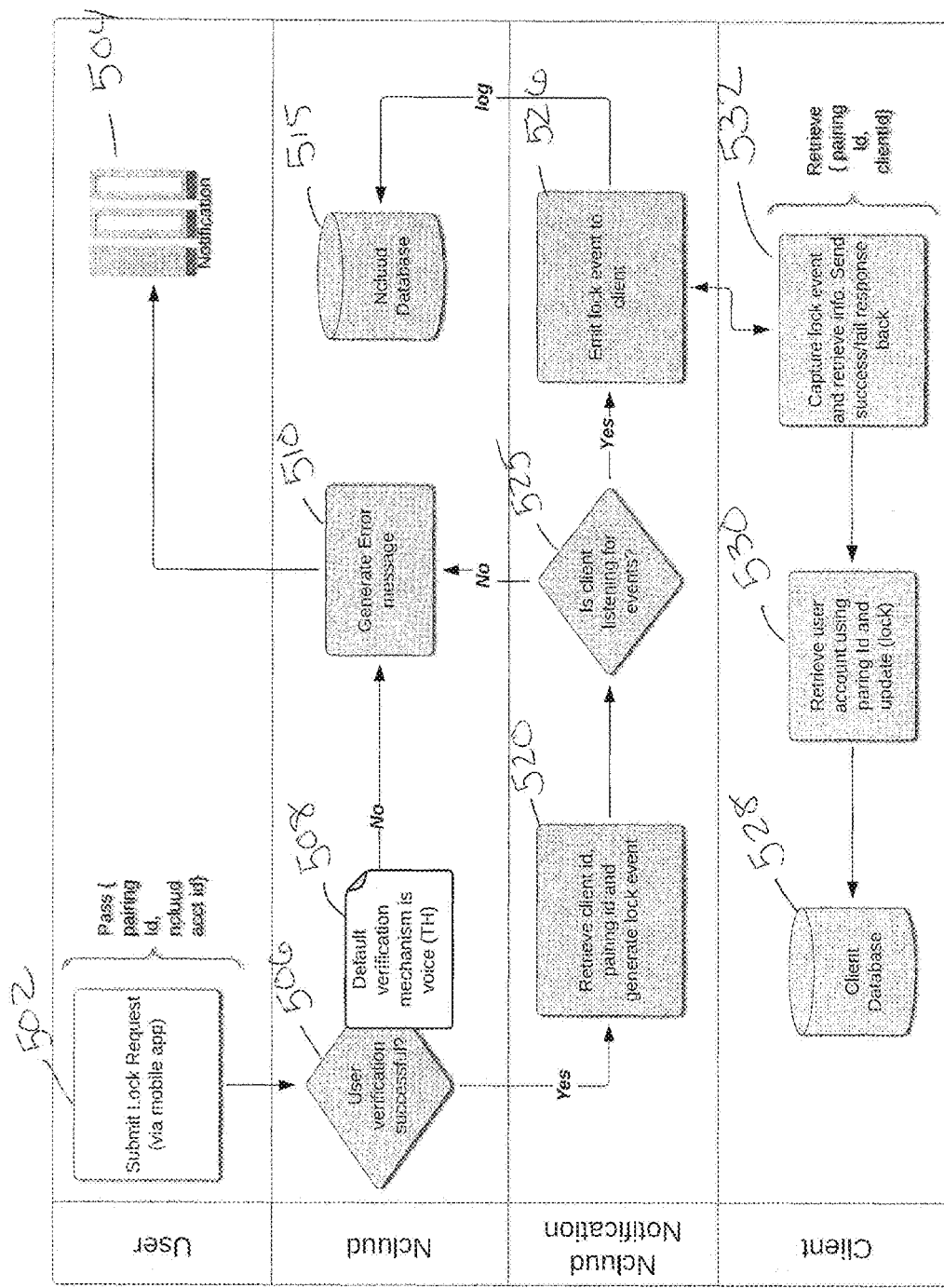
FIG. 5A is a flow diagram of an example account locking process according to some embodiments of the invention.
Figure 5C:
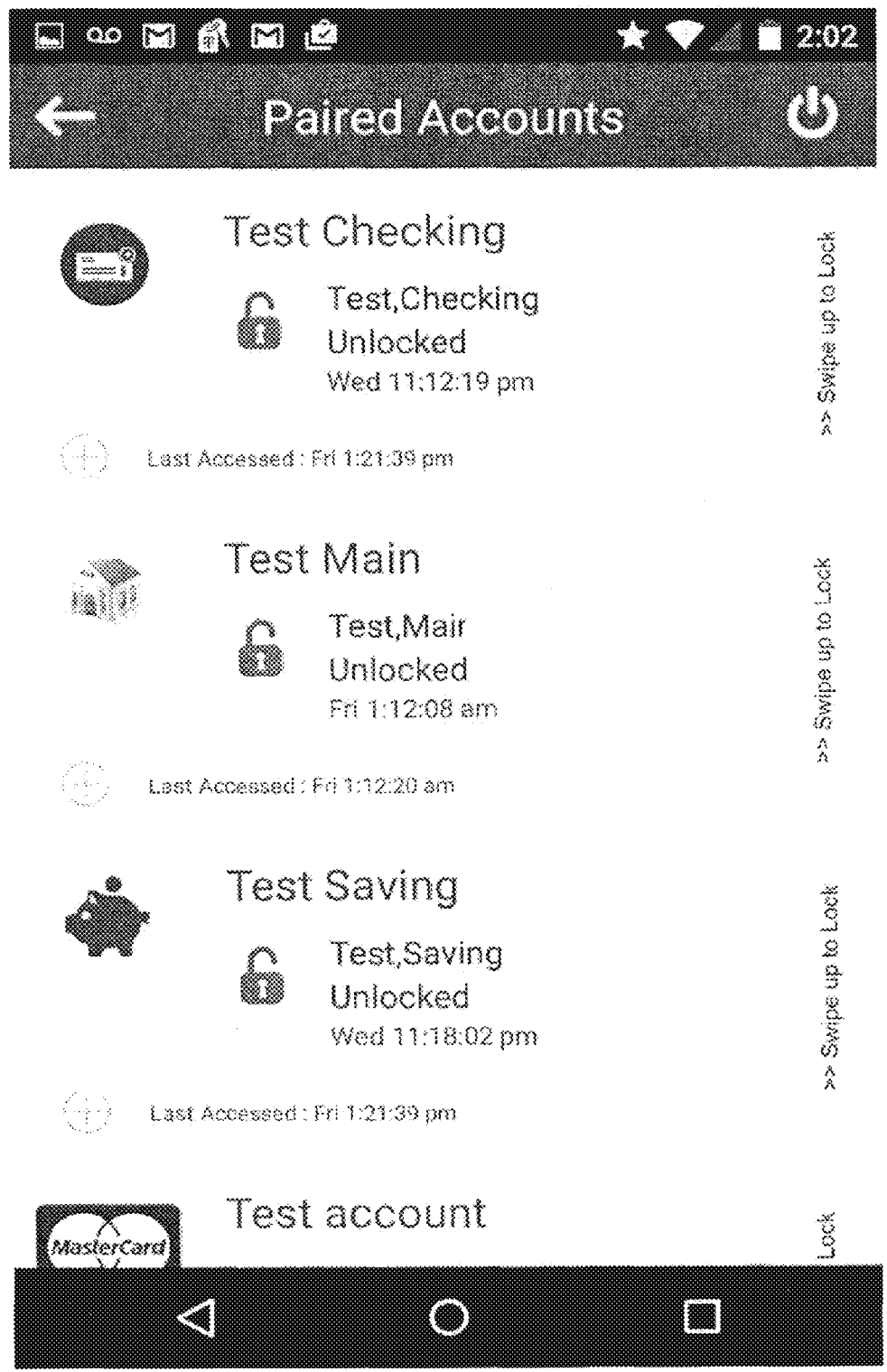
FIG. 5C-5E is an example interface for displaying and locking unlocked paired accounts according to some embodiments of the invention.
Figure 5D:
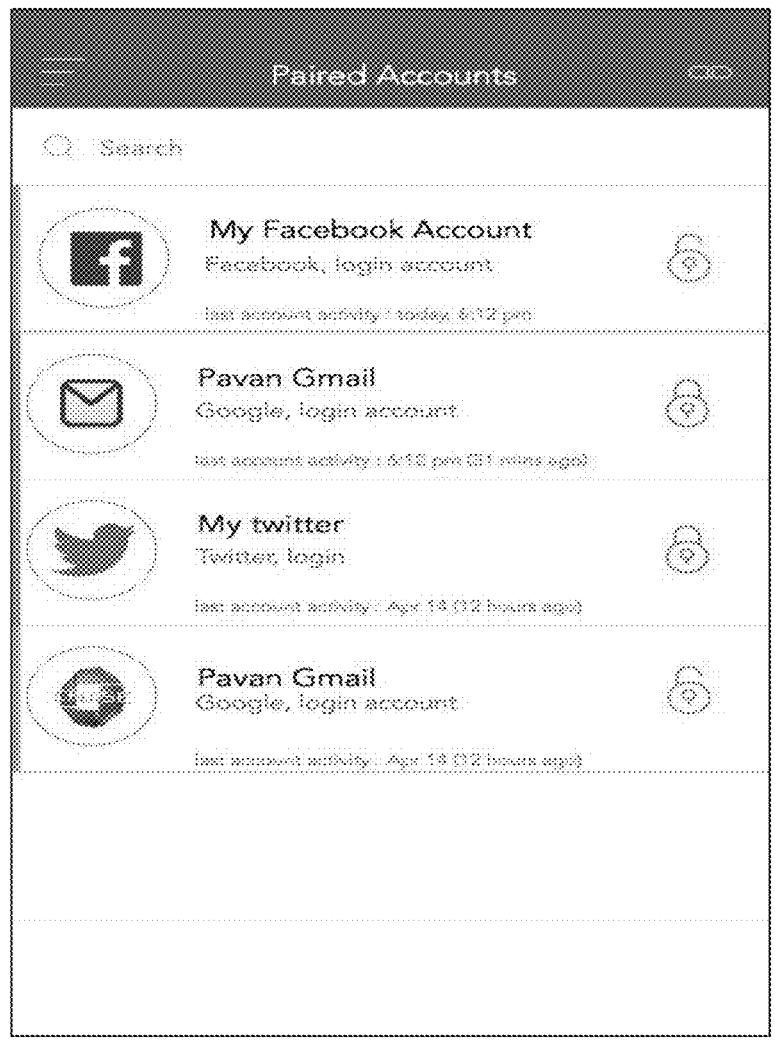
Figure 5E:
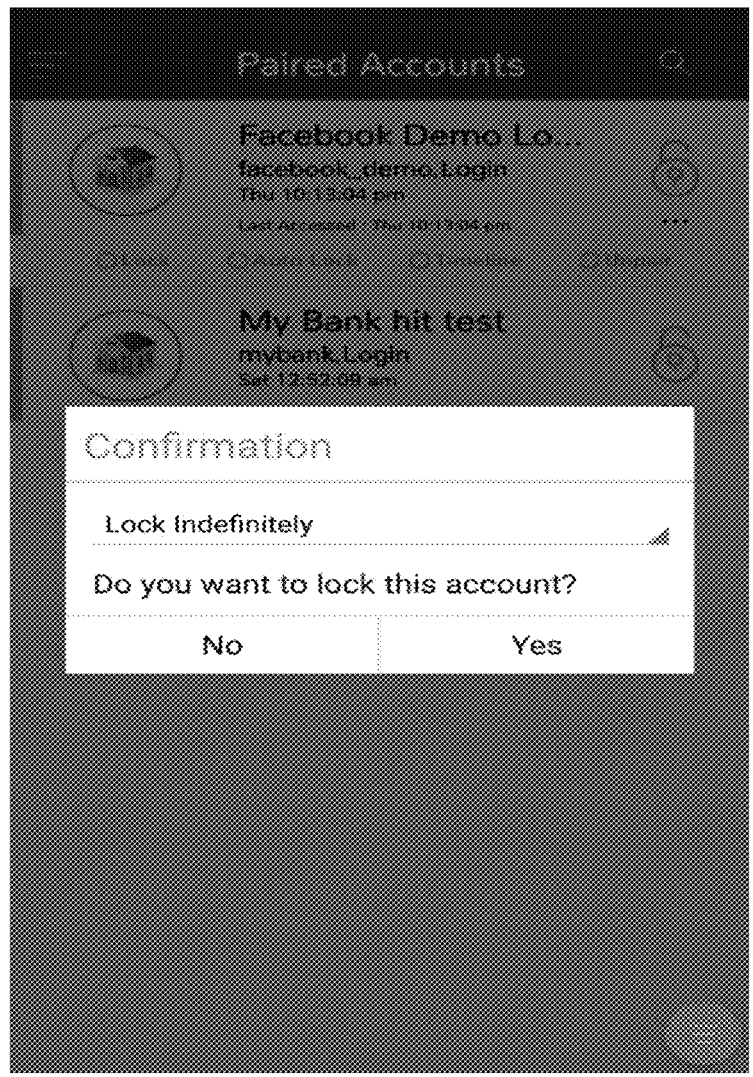

Some or all of the client and pairing information may be further stored at the authentication application for providing pairing information to the user. For instance, the client application may provide a list of paired accounts to a user, such as shown in FIG. 5C-5E, to enable selection for performing additional actions in regards to the pairing, such as changing the lock status of the pairing. The client application may use the client and pairing information for other purposes, such as monitoring use activities and generating reports related to the user activities or any other purpose related to pairing. The user may further select to unpair the paired account using the option shown in FIG. 5E, which may entail the same process as described above for pairing the user account for the client application 250, but may instead remove the pairing from the authentication database 240 and may require a different level of authentication (e.g., voice verification versus human authenticators).

Locking User Accounts

Once a user account is paired to the authentication account for the user, the user may remotely change the lock status (i.e., lock and unlock access to the account) of the account. For example, the user may change the lock status because the account is under attack or breaches, or because of a future period of account inactivity (e.g., sleeping, traveling, and such). The user by means of the authentication application running on computing device 220 may select an option to view a list of the paired user accounts, such as the "Paired Accounts" option in FIG. 3C. The selection of the "Paired Accounts" option of FIG. 3C may then provide the user a "Paired Accounts" screen, such as FIG. 5C-5E, for performing action in regards to the paired account. For example, to lock the paired account 502 according to the embodiment shown in FIG. 5A, the user may swipe the "Swipe up to Lock" option on FIG. 5C, or touch the lock icon on FIGS. 5D-5E. In some embodiments, as illustrated in FIG. 5E, the user may be prompted to confirm locking a particular account, such as the banking account of FIG. 5E, prior to the computing device 220 commencing the locking process.

In other embodiments, the user may initiate the locking of a paired account using various other methods. In some embodiments, the user may lock settings for the client application 250, rather than locking access to the entire client application 250, such as locking access to particular settings screens available from the web application 235 for the client application 250. In example embodiments, the user may initiate the locking using other options (buttons, voice commands, and such) on the authentication application executing on the computing device 220, by a telephone call to an IVR system (as shown in FIG. 1C), or sending a text message, email message, twitter/tweet message, and other such message. In the other embodiments not using the authentication application, the IVR system receiving the telephone or agent server receiving the text message, email message, twitter/tweet message, and such, may perform the actions described as being performed below by the authentication application. In these other embodiments, the user may be prompted for, or required to include in the send messages, indication of lock request, username, passphrase, pairing code, and other such information identifying the user and paired account, which may be used by the IVR system, agent server, or such to access the user's authentication account (and paired account information) from the authentication server 240 prior to performing the below described actions.

Once the user selects the lock option 502, the authentication application may require additional verification of the user's identity, as the pairing action may be considered a heightened security action. In the embodiment of FIG. 5A, the required verification is voice verification 508 which may require the user to speak a word not commonly spoken and verify the speech against a stored sample of the user's voice or perform other digital verification of the user's voice. In other embodiments, authentication may not be required or a different authentication method may be used, such as confirming biometric information (e.g., by means of a finger swiping), performing behavioral and implicit authentication, performing voice based verification, or by use of authenticators. If the authentication fails, the authentication application notifies the user that the pairing request failed by generating an error message 510. The authentication application may also take various additional actions, such as deactivating the user's login to the user authentication account. If the user is successfully authenticated 506, the client application may communicate the changed lock status request to locked to the authentication server 240, which may include the pairing identifier, pairing name, or other pairing information to identified the paired user account to be locked.

In response to receiving the changed lock status request to locked at the authentication server 240, the authentication server 240 may retrieve the pairing information related to the paired user account. The user may retrieve pairing information 520 included an the request, and then use this pairing information to retrieve additional pairing information 520 from the authentication database 245 for the user authentication account, including client information linked to the pairing information in the authentication database 245. The authentication server 240 may then use the retrieved pairing and client information to generate lock events. The authentication server 240 may use the retrieved client information to determine the client to send the lock event to lock the user account. The client information may include information for sending the lock event to the client, such as the IP address of the client. If the authentication server 240 determines that the client is listening for events 525, the authentication server sends the lock status event to the client 526, including information to identify the paired user account, such as the pairing identifier.

In response to receiving the lock status event to lock the paired user account, the client application 250 may extract information from the event, such as the pairing identifier, 532 to retrieve information regarding the corresponding paired user account from the client database 255. If the client application 250 does not locate a corresponding user account, the client application 250 may return a failure response to the authentication server 240, indicating that paired user account could not be found. The authentication server may also indicate further reasons for not locating the paired user account, such as various system errors. If the client application 250 does locate a corresponding user account 530, in some embodiments, the client application 250 may update information in the client database 528 to indicate that the user account is now locked 530. In some embodiments, the client application 250 may be provided by client API 232, such as a JAVA plugin or service, which can be executed to update 528 the application database 255 of the client application 250 to indicate that the user account is now locked 530. For example, see the updateAccountStatus function in Appendix A. The client application 250 may then return a success response to the authentication server 240, indicating that the paired user account was locked 532.

Unlocking User Accounts

Similarly, the user may change the lock status to unlocked. The user 220 by means of the authentication application running on computing device 220 may select an option to view a list of the paired user accounts, such as the "Paired Accounts" option in FIG. 3C. The selection of the "Paired Accounts" option of FIG. 3C may then provide the user a "Paired Accounts" screen, such as FIG. 5C, for performing action in regards to the paired account. For example, to lock the paired account 502 according to the embodiment shown in FIG. 5A, the user may swipe the "Swipe up to Unlock" option to unlock the paired account. In other embodiments, the user may initiate the unlocking of a paired account using various other methods. In other embodiments, the user may initiate the unlocking using other options (buttons, voice commands, and such) present on the authentication application executing on the computing device 220, by a telephone call to an IVR system (as shown in FIG. 1C), or sending a text message, email message, twitter/tweet message, and other such message. In the other embodiments not using the authentication application, the IVR system receiving the telephone or agent server receiving the text message, email message, twitter/tweet message, and such, may perform the actions described as being performed below by the authentication application. In these other embodiments, the user may be prompted for, or required to include in the send messages, indication of unlock request, username, passphrase, pairing code, and other such information identifying the user and paired account, which may be used by the IVR system, agent server, or such to access the user's authentication account (and paired account information) from the authentication server 240 prior to performing the below described actions.

Once the user selects the unlock option 540, the authentication application may require additional verification of the user's identity, as the pairing action may be considered a heightened security action. In the embodiment of FIG. 5B, the required verification is to call one or more authenticators 542 in accordance with the authenticator process discussed above in regards to FIGS. 3A and 3B. If an authenticator is available 550, the authenticator will be contacted as described for FIGS. 3A and 3B to identify the user and send a response to the authentication server 240 regarding the identity (i.e., confirming or denying the identity) 548. If an authenticator is unavailable 550, the user may be notified as part of the peer session 552 and the user may be prompted to select another authenticator for identifying the user 543. Otherwise, the authentication by the authentication server 240 may be performed based on the response of the remaining authenticators (if any) 544 or another authentication method (e.g., voice or biometrics) may be instead used to identify the user.

In other embodiments, authentication may not be required or a different authentication method may be used, such as confirming biometric information (e.g., by means of a finger swiping), performing behavioral and implicit authentication, performing voice based verification, or by use of authenticators. If the authentication fails, the authentication application notifies the user that the pairing request failed by generating an error message 510. The authentication application may also take various additional actions, such as deactivating the user's login to the user authentication account. If the user is successfully authenticated 556, the client application may communicate the changed lock status request to unlocked to the authentication server 240, which may include the pairing identifier, pairing name, or other pairing information to identified the paired user account to be locked.

In response to receiving the changed lock status request to unlocked at the authentication server 558, the authentication server 240 may retrieve the retrieve the pairing information related to the paired user account. The user may retrieve pairing information 558 included in the request, and then use this pairing information to retrieve additional pairing information 558 from the authentication database 562 for the user authentication account, including client information linked to the pairing information in the authentication database 245. The authentication server 240 may then use the retrieved pairing and client information to generate unlock events. The authentication server 240 may use the retrieved client information to determine the client to send the lock event to lock the user account. The client information may include information for sending the lock event to the client, such as the IP address of the client. The authentication server sends the lock status event to the client 560, including information to identify the paired user account, such as the pairing identifier.

In response to receiving the lock status event to lock the paired user account, the client application 250 may extract information from the event, such as the pairing identifier, to retrieve information regarding the corresponding user account from the client database. If the client application 250 does not locate a corresponding user account, the client application 250 may return a failure response to the authentication server, indicating that paired user account could not be found. The authentication server may also indicate further reasons for not locating the paired user account, such as various system errors. If the client application 250 locates a corresponding user account, the client application 250 may update information in the client database 255 to indicate that the user account is now unlocked. In some embodiments, the client application 250 may be provided with client API 232, such as a JAVA plugin, that can be executed to update the client database 528 to indicate that the user account is now unlocked. For example, see the updateAccountStatus function in Appendix A. The client application 250 may then return a success response to the authentication server 240, indicating that the paired user account was unlocked.

In some embodiments, the user may set predefining locking and unlocking time for robotically locking/unlocking each paired account. The user may select the predefined locking times (e.g., certain hour of the day or days of the week) using the authentication application on the computing device 220, as shown by the "Auto Lock" option in FIG. 5E. Using the "Auto Lock" option to set predefined locking times may require the same authentication process as described above to set lock status at the authentication server to also set predefined locking times at the authentication server. Once this process is complete, the authentication server may continuously, robotically lock/unlock the user account for the client application based on the set predefined locking time (e.g., nighttime) or based on inactivity with the authentication server. In some embodiments, when the user accesses the computing device 220, the authentication application on the computing device may transmit the access status to the authentication server, along with external factors, such as detected geo location of the user (e.g., on an airplane), time of access, and any other such detected external factors. The authentication server may automatically, robotically lock the user account based on the user access and the detected external factors. The user may also group paired account together under one configuration option, similar to credit and bank cards in a wallet, such that a user via a computer device 220 may lock/unlock the paired accounts as a group by selecting the option. In this way, a user need not go through the tedious effort of individual locking/unlock each account or inadvertently forgetting to lock a particular account. The predefined locking times and external factors may be used to lock/unlock the paired account as the configured group, as for locking/unlocking a paired account individually.

Application of Multiple Authentication Factor PIN

As part of securing the user account of the client application 250, the cyber deadbolt system of the present invention may further include a multiple authentication factor (e.g., two or more factors) PIN features of the client application 250. That is, certain online accounts for client applications 250 (e.g., online bank accounts) enable a user to provide a phone number of the user's mobile device 220, which is stored in the user's account profile for the client application 250. When the user later attempts to access the account, the client application 250 sends an automatically generated PIN to the phone number to the mobile device 220, and the user then must provide the received PIN as part of the login process to the user account. In the cyber deadbolt system, the authentication application enables the user to request an alternative mobile number for the user's mobile device 220 for use in the multiple authentication factor PIN process. In response to the request, the authentication server 240 registers for a new mobile phone number (e.g., via a service provider), in which calls or messages sent to the new mobile phone number are transmitted to the authentication server. The new (alternative) mobile number is provided to the user through the authentication application configured on the mobile device 220, and the authentication server maps the alternate mobile phone number to the user's account stored in the authentication database 245 for later reference. The user may then use this alternative mobile phone number, rather than the mobile phone number provided by the service carrier of the mobile phone 220, when configuring his/her user account for the client application 250.

When a requestor later attempts to access the user's unlocked user account for the client application 250, the client application 250 sends the generated PIN to the alternative phone number. The authentication server 240 receives the transmission of the PIN to the alternative phone number, and maps the alternate phone number to the user's account containing information identifying the respective user's mobile phone 220 (e.g., device identifier, peer identifier, encryption keys, and such). The authentication server 240, over the trusted execution environment, then sends the PIN to the authentication application configured on the user's mobile phone 220, which generates an indication to the user (e.g., flashing the authentication application icon or buzzing). In order to view the PIN, the requestor must touch an authentication application icon (e.g., swipe an icon for the authentication application on the mobile device screen) to open the authentication application. The act of touching the authentication application may collect biometric or behavioral information from the requestor (e.g., fingerprint) which is compared to the same stored biometric or behavioral information collected from the user during onboarding (e.g., using Zighra technology). In other embodiments, the authentication application may initiate further or different authentication of the user (e.g., voice verification, contacting human authenticators, etc). The authentication application will only allow the requestor to open the authentication application if the currently collected biometric or behavioral information matches the stored biometric or behavioral information of the user, thus, preventing the requestor, if not the user, from accessing the PIN.

Applications of Locking System to Physical Devices

The cyber deadbolt system of the present invention, including the authentication server 240 and authentication database 245, may be further used in other applications besides managing user account for client applications 250. In some embodiments, the system may be used to control the connectivity of network devices (e.g., routers, switches, hubs, any Internet of Things device, and such) and access to logs on such devices. In these embodiments, a version of the client application programming interface (API) 232, e.g., software plugin or service as shown in Appendix A, is installed on the network device in communicate with the connectivity interfaces of the network device (e.g., in direct communication with the components comprising the connectivity interfaces or with the administrative applications configured to control these components). The installation of the API 232 may similarly subscribe the network device to the authentication server 240 as described in the "Setting Up Client Application" section, and may also generate a pairing code for the network device (e.g., in a file on the network device). In some embodiments, the API 232 may include an administrative console that enables the user to generate, view, and manage the pairing code (e.g., as a QR code) from a remote device once the API 232 is installed on the network device.

Once the pairing code is received by the user, the pairing and locking/unlocking processes may be performed in accordance with the above "Pairing User Accounts for Client Application to Authentication Account," "Locking User Accounts," and "Unlocking User Accounts" sections, including setting predefined locking/unlocking time and locking/unlocking by detecting the user's geolocation (e.g., by the authentication application configured on his/her computing device 220). Similarly, a version of the API 232 may be installed to pair/lock/unlock any other physical device configured with a computer operating systems and network interface to the Internet, such as cars, household appliances (e.g., refrigerators, stoves, and such), home security systems, and such.

Applications of Locking System to Mobile Phones

The cyber deadbolt system of the present invention, including the authentication server 240 and authentication database 245, may be further used to robotically lock a user's computing device 220, such as the user's mobile phone or any other mobile computing device. When the user installs the authentication application and registers with the authentication server 240 on the user's mobile phone, as described in the "Setting Up Authentication Account" section, the user may select to setup the mobile phone with locking/unlocking capabilities. If the user selects this capability, the onboarding process including generating a device identifier associated with the trusted execution environment configured on the mobile phone, which is sent to the authentication server 240 to be stored in the authentication database 245 with the other account registration information (including phone number) collected for the user. The device identifier is also encrypted and stored in the trusted execution environment on the mobile phone.

If the user needs to lock his/her mobile phone (e.g., the user misplaces his/her mobile phone), the user or any other individual on behalf of the user from any device may send a text message, email, twitter/tweet message, or other such message, to a designated address of an agent communicatively coupled to the authentication server 240; the message including identification information for the user (e.g., username and passphrase) and an indication of the lock request. In some embodiments, the user or individual on behalf of the user may call a designated phone number to an IVR communicatively coupled to the authentication server 240 and provide similar information. The agent server or IVR processes the message or phone call and notifies the authentication server 240 of the lock request, and the authentication server 240 determines that the identification information provided in the message (e.g., username and passphrase) matches the user's authentication account information stored in the authentication database 245. If so, the authentication server 240 retrieves the configured device identifier from the user's authentication account stored in the authentication database 245, and over the trusted execution environment with the mobile phone 220, the authentication server 240 transmits the device identifier to the authentication application on mobile phone 220. If the authentication application determines that the device identifier matches device identifier stored and encrypted on the mobile phone, the authentication application changes the setting on the mobile phone to lock and presents a lock icon on the mobile phone screen. When the user locates his/her mobile phone, the user may select the lock icon, and the authentication application will transmit a request to the authentication server 240 to begin the process to confirm the user's identity, including contacting human authenticators, matching voice, biometric or behavioral, or other security information for the user. If the authentication is completed successfully, the authentication application then unlocks the user's mobile phone for access.

Applications of Locking System to Accessing Physical Information

The cyber deadbolt system of the present invention, including the authentication server 240 and authentication database 245, may be further used in other applications for storing and accessing physical information. For example, the user may store important information, passwords, documents (e.g., electronic wills), account numbers, bitcoin and such in a distributed data service system (online safety deposit box), such as MaidSafe, or event logs on any physical system. For example, the distributed data service system may be configured as a client application 240 in accordance with the above "Setting Up Client Application" section and the user may pair their allocated data storage in the distributed data service system with his/her user authentication account at the authentication server 240 via the authentication application on the user's computing device 220 according to the above "Pairing User Accounts for Client Application to Authentication Account" section. In some embodiments, the pairing may automatically place the user's allocated data storage in the distributed data service system in lock status. In order to gain access to the user's physical information, a requestor would then need to follow the above "Unlocking User Accounts" procedure, include being identified as the user by at least one of human authenticators, voice, biometric, or behavioral authentication.

In some embodiments, when onboarding to setup a user authentication account with the authentication server 240, the user may specify trustees (and human authenticators for the trustees) who should have access to the information in case of the death or other incapacitation of the user. In these embodiments, the authentication server 240 would periodically check death registries and other such registries (e.g., hospital registries, newspaper obituaries, and such), and if the user is reported as deceased automatically contacts the user's specified trustees regarding the user's stored physical information. The authentication server 240 may then confirm the identity of the trustee, by contacting the human authenticators specified for the trustees, prior to releasing the user's secured information in the distributed data service system to the trustees.

Further, the transferring, releasing, and changing of the physical information at the distributed data service system is also performed in a secured environment. These operations regarding the physical information (e.g., documents, passwords, etc.) are performed over a peer-to-peer channel using computing devices 220 configured in a trusted execution environment. In some embodiments, the computing devices 220 use encrypted WebRTC for peer-to-peer communication over Secure Real-Time Protocol (SRTP), and Datagram Transport Layer Security (DTLS) is used to secure all data transfers between the peers. In these embodiments, a device identifier, peer identifier, and PIN/token is generated for each computing (peer) device 220 configured for the peer-to-peer channel (and stored at the authentication server 240) for authenticating communications within the trusted execution environment.

Once the user successfully logs into the unlocked account for the distributed data service system, the user may attempt to transfer or change physical information protected by the account. The distributed data service system initiates peer-to-peer communications with the user's peer device 220 by the WebRTC protocol requesting to open a channel to the user's peer device 220, which is generated as a new routing path through the network, to establish a connection for securely transferring or changing the physical information at the distributed data service system. The authentication server 240 provides authentication for the peer-to-peer connection by verifying the generated token/PIN at the registered peer device 220 matches the token/PIN specified in the initiated communication. If the connection is successfully authenticated, the user via the peer device 220 may transfer data or change data, using an encryption key generated when registering the peer device 220 to the trusted environment (and provided to the distributed data service system from the authentication server 240), for securely transferring or changing the physical information.

Health Monitoring and Reporting

The client API 232 installed at the client application 250 may further monitor the activities of the user accounts to capture health related information. The captured information may include every login attempt (success and failed) to the paired and unpaired user accounts. For each login attempt, the client API 232 may capture information including state of user account (e.g., paired, unpaired, locked, unlocked, and such), date and time of the attempt, IP address of the attempt, geo locations of the attempt (i.e., of the user making the attempt), whether attempt was success or failure, and transaction related to successful attempt. The client application 250 may then provide the captured information to the authentication server 240 for further processing. In some embodiments, the client API 232 may send (i.e., publish) the captured information to the authentication server 240. For example, see the publish function in Appendix A. Note, in some embodiments, all personal identifiable information (PII) may be removed from the captured information by the client API 232, prior to sending the captured information to the authentication server 240. The authentication server 240 may capture and depersonalized similar information for every lock/unlock attempt to the paired user account.

Figure 6A:
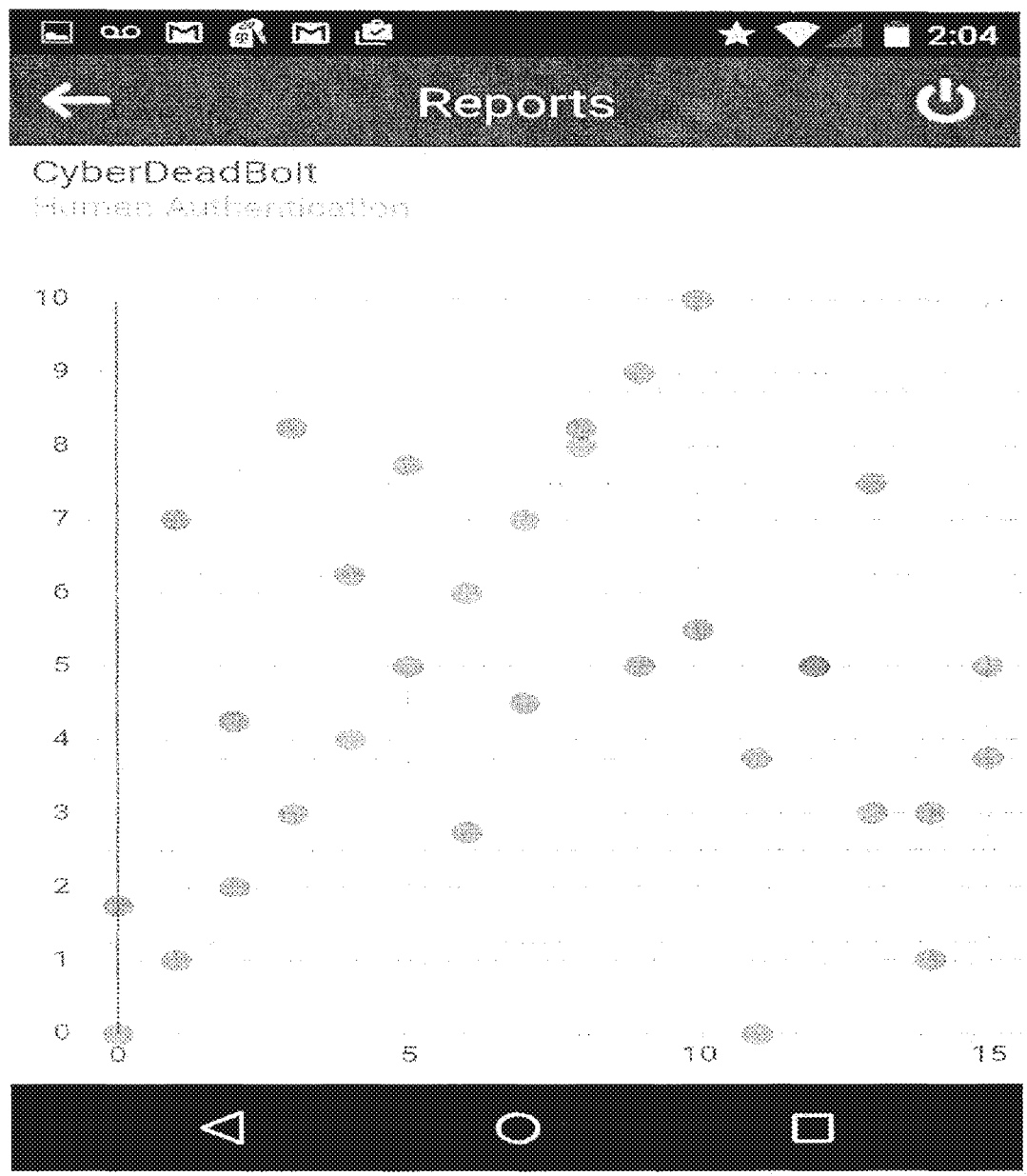
FIG. 6A is an example scatter report for displaying login activity of a user account according to some embodiments of the invention.
Figure 6B:
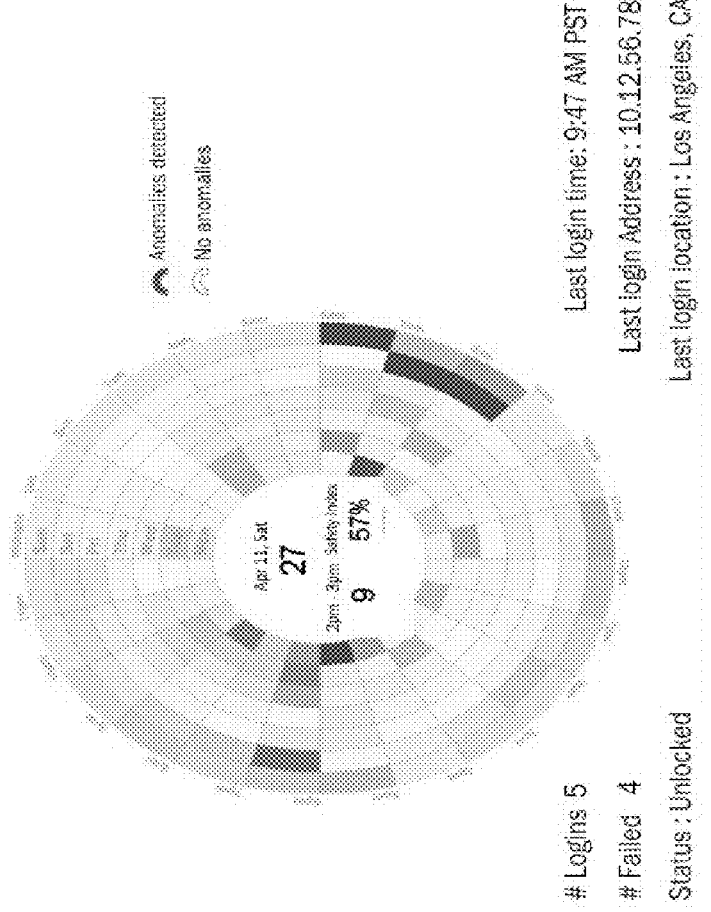
FIG. 6B is an example holistic report for displaying login activity of a user account according to some embodiments of the invention.
Figure 6C:
FIG. 6C is an example timeline for displaying login activity of a user account according to some embodiments of the invention.

The authentication application on the computing device 220 may request the capture information, and processed the captured information to provide reports and alerts to the user of the associated paired user account. In regards to reports, the authentication application may enable the user to generate a report in the form of a chart (e.g., Scatter Chart or Bubble Chart) that displays the number of successful login and lock/unlock attempts over a specified period of time. The chart may be a scatter chart that presents the number of successful logins and login attempts by the hour for login accounts. For non-login accounts the scatter chart may present the access times by the hour. The scatter chart may also display lock/unlock times of accounts for the user to easily identify status of the accounts by the hour. For example, FIG. 6 displays an example Scatter Chart that may be accordingly generated in regards to a paired user account. The chart may also be a bubble chart that displays the health of all accounts by color and size, for example, the default color of the displayed bubbles are green, which gradually changes to red based on number of unsuccessful login attempts and also the size of the bubble increases. The chart may also be a holistic chart, as shown in FIG. 6B, that organizes the captured information in hourly periods per day to compare the days for a week timeframe, along with highlighting anomalies detected in the hourly periods. The authentication application may also enable the user to select a Timeline option, as shown in FIG. 5E, which displays the captured information for the paired account as a timeline, as shown in FIG. 6C.

Figure 3C:
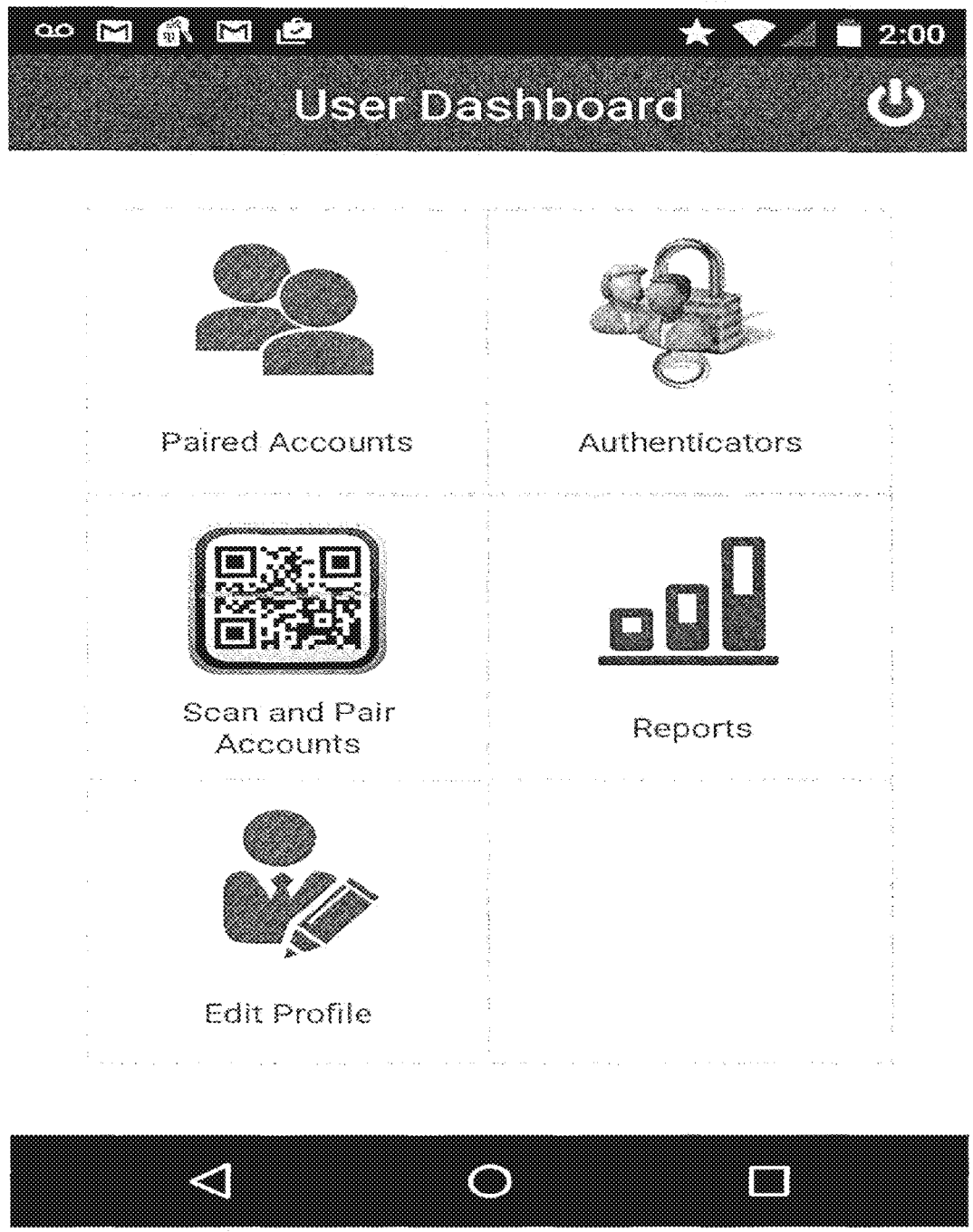
FIGS. 3C and 3D are example interfaces for selecting options for configuring and managing a user authentication account according to some embodiments of the invention.
Figure 3D:
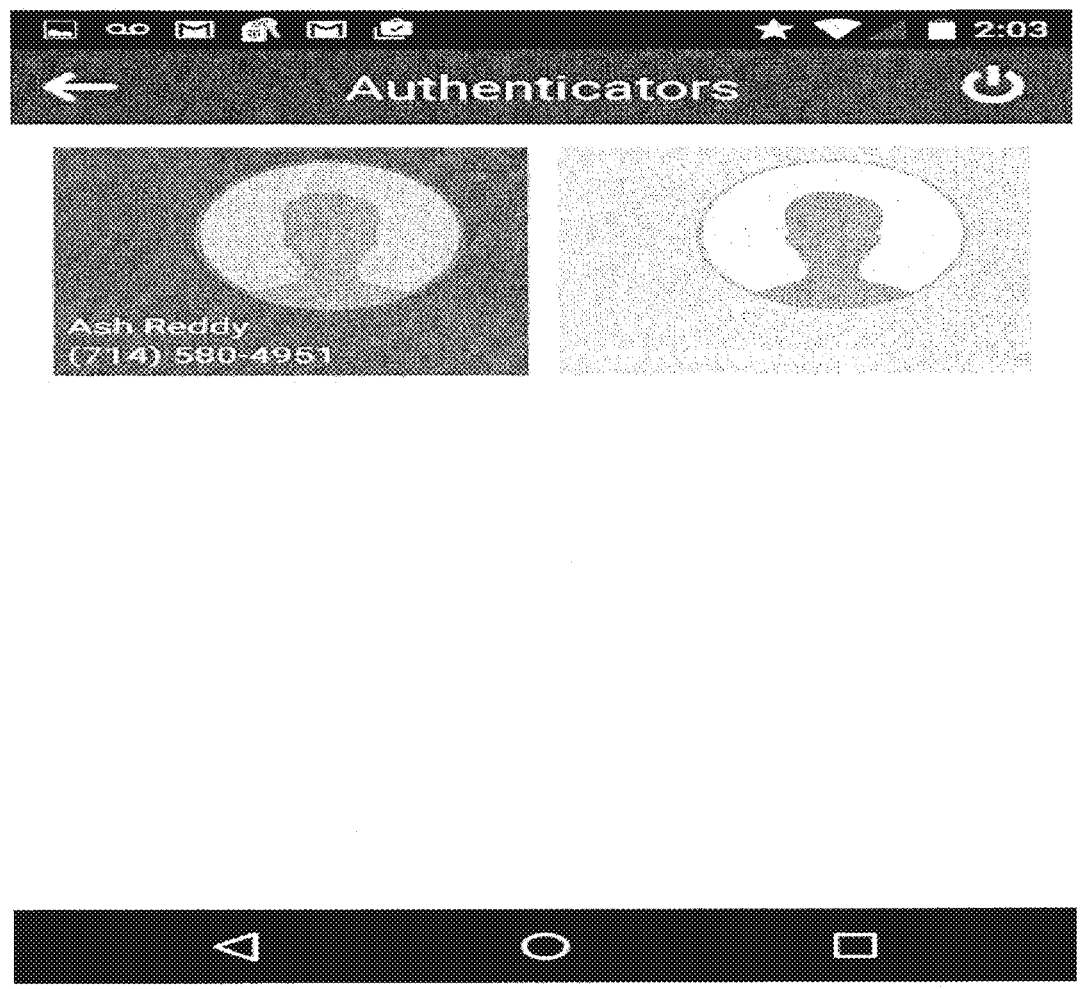
Figure 4C:
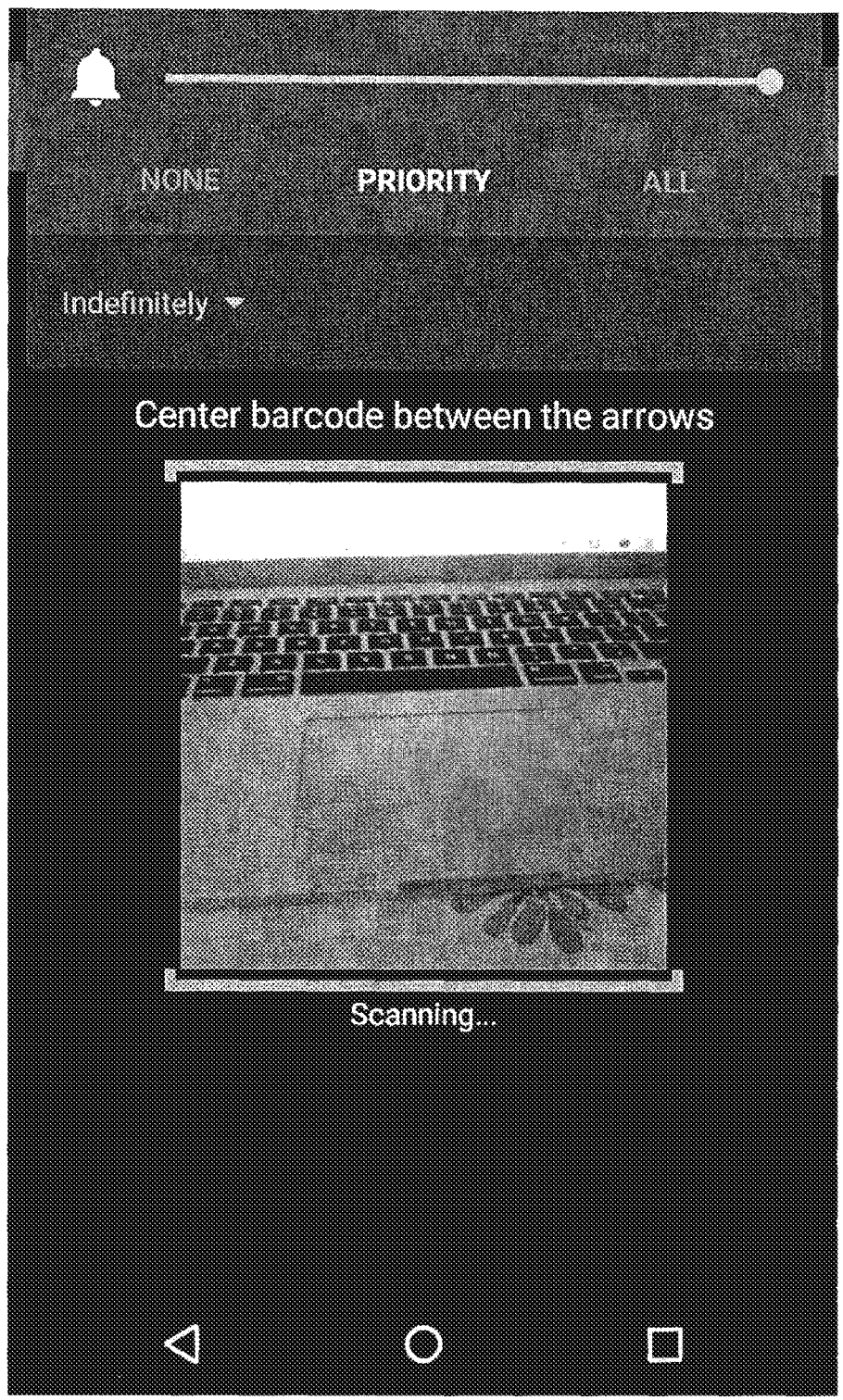
FIG. 4C is an example interface for scanning a pairing code to pair a user account according to some embodiments of the invention.

In some example embodiments, a user logged into his/her user authentication account by means of an authentication application running on computing device 220 may select a report option, such as the "Reports" option in FIG. 3C. The selection of this option may prompt the user for specifics regarding the generated chart, such as a specific time period or the type of chart (e.g., Scatter or Bubble), and then the client application may request the corresponding captured information for the authentication server 240. The returned information may then be displayed to the user via the client application running on the computing device in the selected chart format, such as the Scatter Chart format in FIG. 6.

The authentication server 240 may further process the captured information for unusual patterns of activity experienced by a paired user account. For example, if an account experiences continuous unsuccessful logins or accessed when it is actually in locked status, and the authentication server 240 detects such activity, the authentication server 240 may generate a general alert, which is sent to the authentication application executing on the computing device 220 of the user for display. Alternatively, if the authentication server 240 determines that the activities are severe (e.g., brute force attack to hack into the account), then the authentication server 240 may send a request to the API 232 at the client application 250 to automatically lock the user accounts described above, and update the authentication database 255 accordingly. The authentication server 240 may further notify the user of the user account of the attack by sending an amber alert to the respective authentication application running on the computing device 220, which may flash or buzz to notify the user.

CyberScore

The cyber deadbolt system may further provide a user with an empirical score that enables the user to assess the strength of his/her cyber security framework. The cyberscore may be calculated based on various factors regarding the login accounts of the user. For example, the cyberscore may include the level of authentication set for accessing the user's accounts. A higher value may be included in the cyberscore if the user's accounts are setup for only username/password verification, but lower values may be included in the cyberscore if the user's accounts are paired accounts setup with voice or biometric authentication, and even lower if they are paired accounts setup with human authenticators for authentication. In addition, the cyber score may account for how many of the user's accounts are set up according these different levels of authentication. Further, the cyberscore may include the captured information from the user's paired accounts, such that a higher value is included in the cyberscore if the user account experiences frequent unusual patterns of activities (e.g., failed logins) or if the user does not regularly lock his/her paired accounts during periods of inactivity (e.g., at night while asleep), while a lower value is included if the user does regularly lock his/her paired account and does not experience frequent unusual patterns of activities. In addition, the cyberscore may include behavior patterns of the user. For example, if the user is identified as traveling often based on the geolocation detected by the authentication application on his/her mobile device, or the user connects his/her mobile device to unsecure WiFi networks, a higher value may also be included in the cyberscore. A cumulative cyberscore may be generated by using various mathematical and probabilistic methods, which may or may not provide different weights or confidence levels to the different identified factors. The cumulative cyberscore may be compared to threshold values to determine a strength level of the user's security framework, and the user may be offered cyber insurance, in which the premium of the insurance is based on the calculated cyberscore.

Cyber911 Organization

The cyber deadbolt system of the present invention further provides a highly secure individual peer-to-peer channel, where bespoken alerts may be communicated between a collective decentralized autonomous organization of members. Note, the members are all onboarded users of the cyber deadbolt system, with authentication accounts configured with various user identification information, such as voice prints, biometric information, behavioral information, and configured human authenticators. In some embodiments, the members may communicate on the channel using computing devices 220 configured in the trusted execution environment as peer devices, wherein a device identifier is assigned to each device for authentication for communication within the trusted execution environment. In some embodiments, the devices use encrypted WebRTC for peer-to-peer communication over Secure Real-Time Protocol (SRTP), and Datagram Transport Layer Security (DTLS) is used to secure all data transfers between the peers. In these embodiments, a peer identifier is assigned to each computing device 220 (i.e., peer device) configured for the peer-to-peer channel. From the authentication application on the peer devices, the users of the peer devices are notified by the WebRTC protocol to open secure individual channels, which are generated as a new routing path through the network, to establish a connection for receiving a message from the user of a notifying peer device. Further, the user of the notifying peer device may further request that the user of the notified peer device be authenticated by the authentication server 240 (e.g., by human authenticators, voice prints, configured PIN, and such) prior to the user of the notified peer device receiving the message.

The community of users of the secure peer-to-peer channel (i.e., members of the decentralized autonomous organization) may use the channel as a personalized community alert medium (e.g., amber alert) where the members send/received specific alerts from other members when an important client application 250 (e.g., credit card service website, social networking site, and such) paired with the authentication server 240 have been severely attacked or breached. These alerts may prompt members to take immediate actions to lock respective paired accounts to their client application accounts, change the password to these client application accounts, or pair their affected accounts to their authentication accounts at the authentication server 240. Further, the authentication server 240 may automatically take immediate action to lock these paired accounts. Further, the members may be provided with the peer ids of all other users/members in the organization, and rank and review the contributions of these members, which could result in the authentication server 240 from blocking messages/alerts from members who have previously transmitted non-factual attacks/breaches.

Further, using the authentication application on the computing devices, enables the users to select an icon (e.g., button) for emergencies, which sends, in real-time, an emergency beacon to a Fusion Center, local 911 service, or facility incorporating machine intelligence (IMB Watson) using the secure channel. In addition, by the user selecting the icon, the authentication application, in real-time, sends the identity of the user, turns on a microphone and camera on the computing device, and automatically sends a stream to the Fusion Center, local 911 service, or facility incorporating machine intelligence (IMB Watson). There the information may be synthesized with information received from other sources, for analyzing the situation, to give first responders real time information on the situation while they are in route to the emergency.

Financial Services Use Case

Figure 7A:
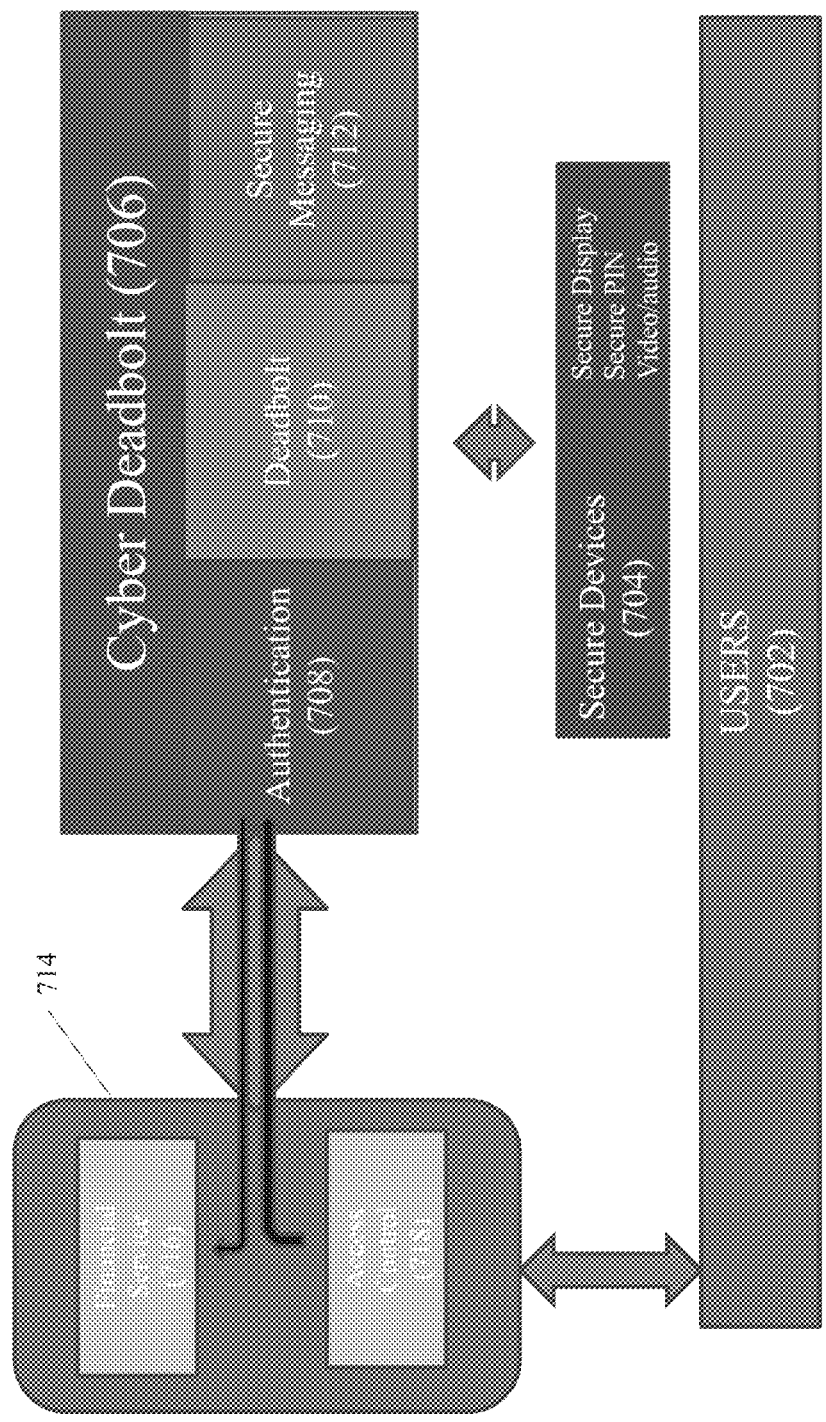
FIGS. 7A-7D depict an example configuration and communication of the present invention in a financial services application according to some embodiments of the invention.

FIGS. 7A-7D depict an example configuration of the present invention in a financial services environment. FIG. 7A illustrates the overview of the cyber deadbolt environment configured for a financial services environment (e.g., for private, public, or government financial services entity). The environment of FIG. 7A includes the finance services customer system 714, which includes a financial services application 716 (e.g., a web-based application) and an interface for access control 718 to the financial service application 716. The users 702 setup financial services accounts, through the access control 718, to provide information and access information to/from the financial services entity via the financial services application 716 over the standard public network (e.g., Internet). The setup of a financial services account may include configuring a username, password, PIN, and such for the user 702 to log into the account.

The environment of FIG. 7A also includes the cyber deadbolt system 706 with components for authenticating users 702, for pairing, locking, and unlocking (i.e., deadbolting) 710 the financial services accounts 716, and for secure messaging 712 documents or other such information to the financial services application 716. In some embodiments, the cyber deadbolt system 706 is communicatively coupled to the finance services customer system 714 in an out-of-band trusted execution environment, over out-of-band channels, in which all communication is encrypted using a unique encryption key and transmitted over a distributed peer-to-peer decentralized network. In other embodiments, the cyber deadbolt system 706 is communicatively coupled to the finance services customer system 714 in an out-of-band environment by configuring WebRTC for peer-to-peer communication using Secure Real-Time Protocol (SRTP), and Datagram Transport Layer Security (DTLS) to secure (e.g., encrypt) all data transfers between the peers (the cyber deadbolt system 706 and the finance services customer system 714), for transmission over the distributed peer-to-peer decentralized network. A cyber deadbolt API (i.e., CDB) 730 is configured at the access control 718 component of the finance services customer system 714 to communicate with the cyber deadbolt system 706 in the configured out-of-band environment. The API 730 enables the finance services customer system 714 to pair users' financial services accounts to user authentication accounts configured at the cyber deadbolt system 706, retrieve lock/unlock status of the paired accounts, and monitor/report activities of these paired account to the cyber deadbolt system 706.

The users 702 communicate with the cyber deadbolt system 706 via secure devices 704 (e.g., secured mobile phone). Note, prior to the communication, the users 702 have onboarded to the cyber deadbolt system 706 (e.g., setup accounts including providing authentication information, such as voice print, biometric information, behavioral information, human authenticators, and such), configured their devices as secured devices 704 for communicating with the cyber deadbolt system 706, and installed the cyber deadbolt authentication application (e.g., mobile application) for communicating with the cyber deadbolt system 706. These secure devices may be communicatively coupled to the cyber deadbolt system 706 in an out-of-band environment, as described above in regards to the communication between the cyber deadbolt system 706 and the finance services customer system 714. The configuration of the secure devices in the out-of-band environment may include assigning unique device identifiers to the secured devices 704, and generating at least one of secure PINs and peer identifiers for secured communication in the out-of-band environment. The secure devices 704 may be configured with the cyber deadbolt authentication application for interfacing with the cyber deadbolt system 706 in the out-of-band environment.

From the authentication application on the secure device 704, a user of the secure device 704 may be notified (or provide notification) by the WebRTC protocol (or other such peer-to-peer protocol) to open a channel, which is generated as a new routing path through a distributed peer-to-peer decentralized network, to establish a connection for securely receiving/displaying 712 a message, document, video/audio, or such from the user of a notifying secure device 704. Further, the user of the notifying secure device 704 may further request that the user of the notified secure device 704 be authenticated by the authentication process 708 (e.g., by human authenticators, voice prints, configured PIN, and such) prior to the user of the notified secure device 704 receiving the message. In this way, the cyber deadbolt system 706 may be configured as a secured notified device 704, and a user 702 via secure device 704 may open a channel to provide requests (and corresponding responses) through the authentication application to the cyber deadbolt system 706 to pair a financial services account, lock/unlock a paired account, or send secure messaging (e.g., documents or other secured information) to the finance services customer system 714 (by way of the cyber deadbolt system 706).

Figure 7B:
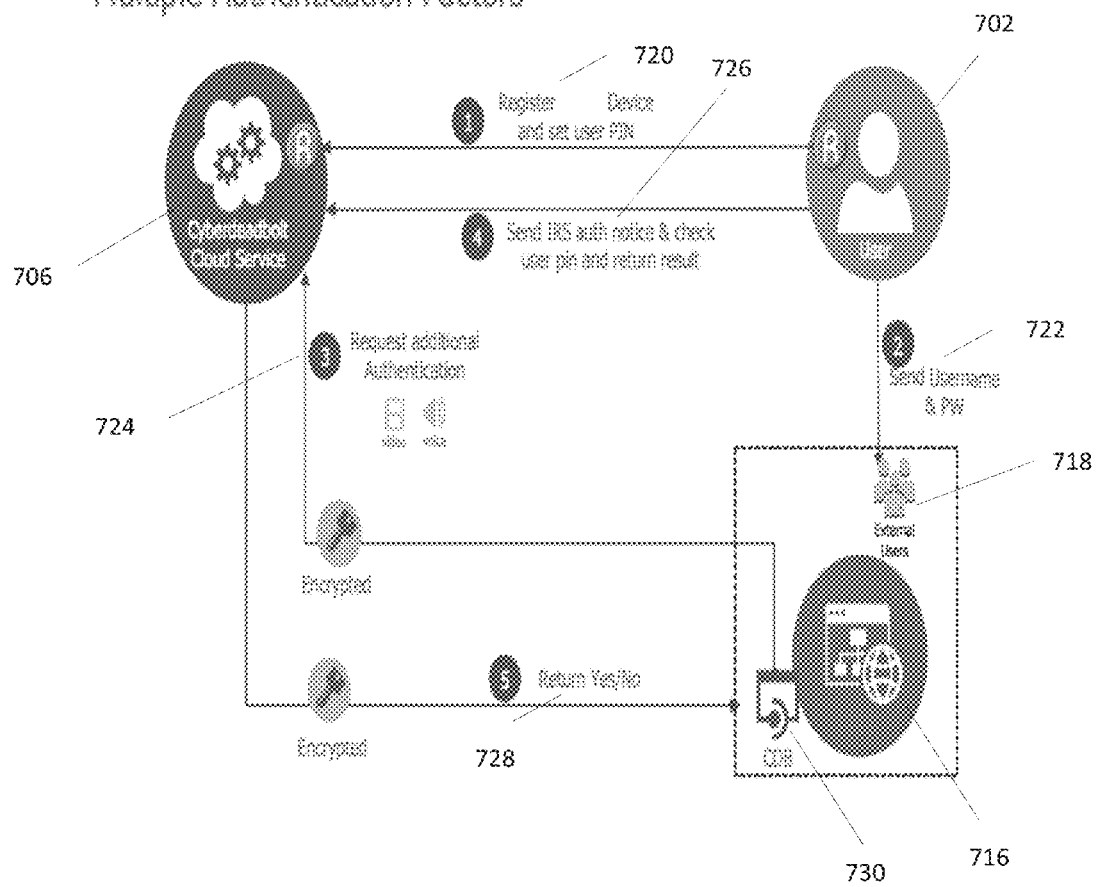

FIG. 7B depicts an example method of using multiple authentication factors for securely providing a requestor information via a user account for the financial services application 716. In the method of FIG. 7B, the user first registered 720 his/her computing device (e.g., mobile device) as a secure device in an out-of-band trusted execution environment, over out-of-band channels, including generating a user PIN. Note, in FIG. 7B, the user also sets up an authentication account with the cyber deadbolt system 706, setup an account with finance services customer system 714, and pairs the financial services account to the authentication account for the cyber deadbolt system 706. The user then attempts to log into his/her financial services account using the financial services application 716 via the external user network interface (e.g., a public network/Internet) to access protected resources. To log the user into his/her financial services account, the financial services application 716 first authenticates the user by requesting the user to provide (send) his/her configured username and password 722 for his/her financial services account. Once the user 702 is logged into the system, the user selects an option to perform a secure transaction, such as requesting to access highly secure information (e.g., filed tax information), and the financial services application 716 determines accessing this information requires additional authentication.

As such, the financial services application 716, via the API 730, communicates with the cyber deadbolt system 706 to request additional authentication 724 for the financial services account (over the out-of-band environment), which is paired to the user's authentication account at the cyber deadbolt system 706. As part of this additional authentication, the cyber deadbolt system 706 may send 726 an authentication notice to the user 702 associated with the paired account (over the out-of-band environment). If the user responses to the authentication notice, the cyber deadbolt system 706 further checks 726 that the PIN received from the responding secured device 704 matches the PIN for the secure device 704 registered for the user. Based on the received PIN matching the registered PIN, the cyber deadbolt system 706 either returns Yes/No 728 to the additional authentication request of the user 702 from the financial services application 716. The financial services application 716 then proceeds to allow or deny the user's accessing of the protected resources based on the returned response to the authentication request. In some embodiments, the cyber deadbolt system 706 may perform other authentication, such as contact human authenticators, in response to the additional authentication request from the financial services application 716.

Figure 7C:
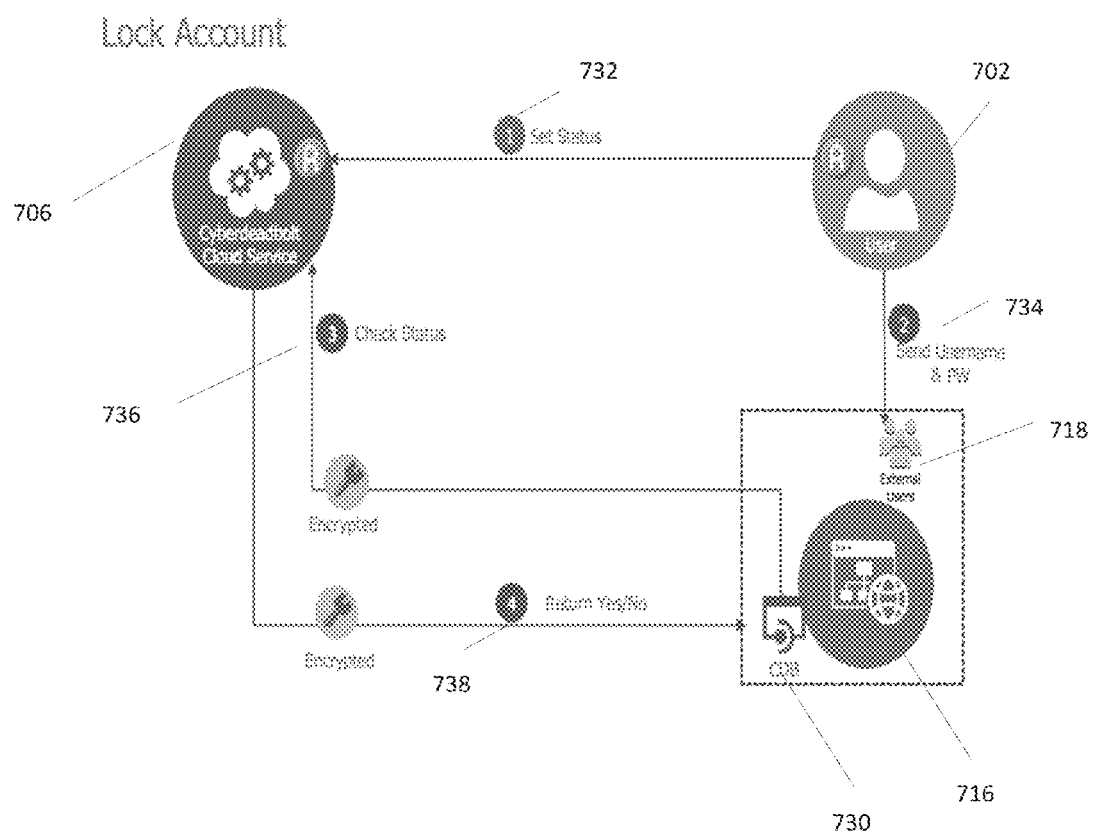

FIG. 7C is an example method for determining whether to allow a requestor to log into a user's paired financial services account. In this method, the user 702 first locks his/her paired financial services account by sending a lock status 732 to the cyber deadbolt system 706 via the authentication application configured on the user's secure device 702. The user has not configured heightened security for locking a paired account, thus, the deadbolt system 706 changes the stored lock status for the paired financial account to locked. At a later time, a request (who is the user 702) attempts to log into his/her account for the financial service's application (via external user network 718) by entering his/her username and password 734. The financial services application 716, in response to the request, sends a check status 736 request, including a pairing identifier for the financial services account, via API 730 to the cyber deadbolt system 706. The cyber deadbolt system 706 receives the request, and based on the pairing identifier, retrieves the stored lock status for the paired financial account. As the stored lock status is set to locked, the cyber deadbolt system 706 returns a Yes status 738 to the financial services application 716 (via API 730), indicating that the user's financial account is locked from being accessed. Based on the returned Yes status, the financial services application 716 denies the requestor's attempt to log into the user's financial account. The user may then decide to unlock the account, and may unlocks his/her paired financial services account by sending an unlock status request 732 to the cyber deadbolt system 706 via the authentication application configured on the user's secure device 702, which may require heightened authentication (e.g., checking voice prints, biometric or behavioral information, calling human authenticators, and such). After unlocking the account, the login method may be repeated, resulting in the user successfully logging into the financial services account.

Figure 7D:
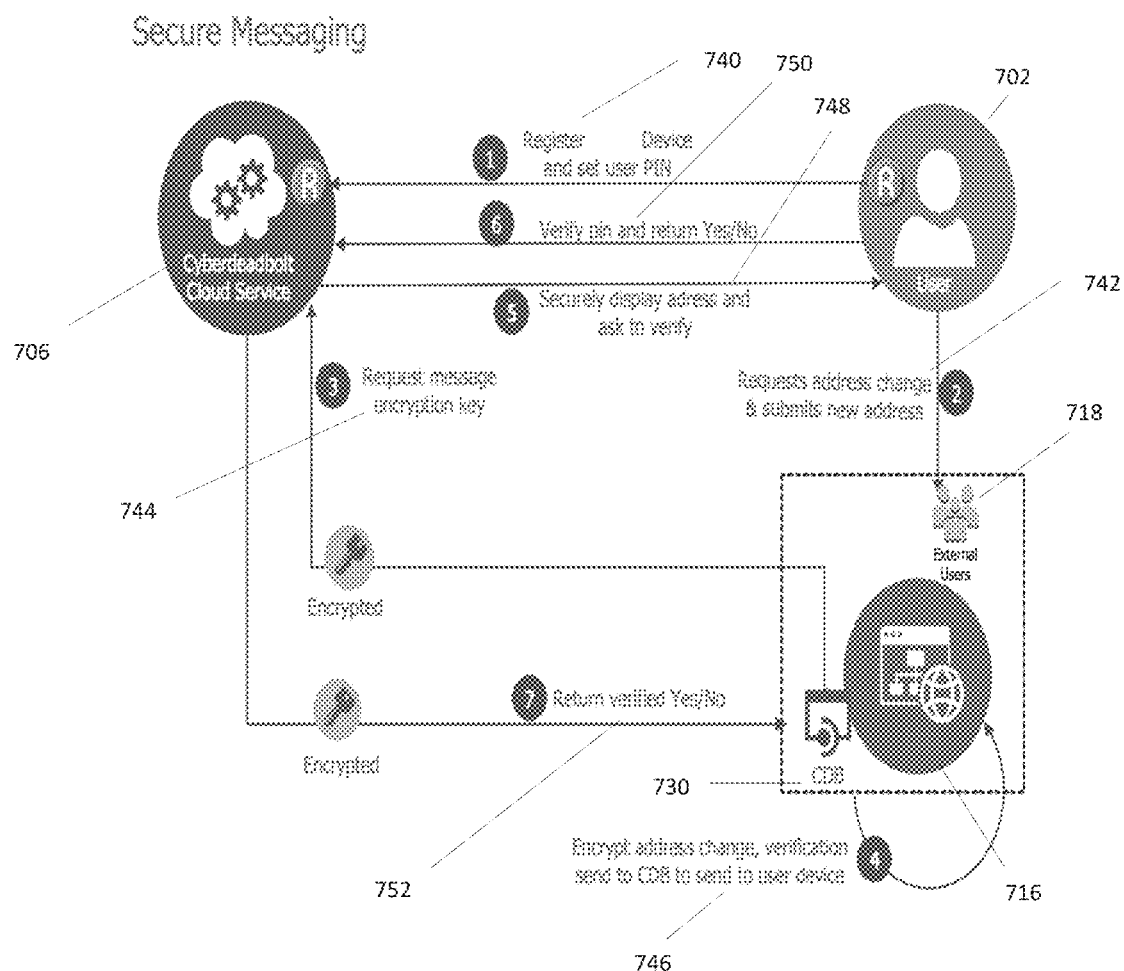

FIG. 7D is an example method for securely messaging information regarding the user's paired financial account to the user's secure device 704. In the method of FIG. 7D, the user first registered 740 his/her computing device (e.g., mobile device) as a secure device in an out-of-band trusted execution environment, including generating encryption keys and a user PIN, which is transmitted and stored at the cyber deadbolt system 706. The user via the secured device 704 logs into his/her financial services account for the financial services application 716 (via external user network 718) and request to perform a change of address transaction 742 (i.e., provide a new address associated with the account). The financial services application 716 (via API 730) requests the message encryption key 744 for the secured device 744 from the cyber deadbolt system 706 based on the pairing identifier for the account.

The financial services application 716 (via API 730) returns the encryption key, as the paired account is configured at the cyber deadbolt system 706, and the financial services application 716, in turn, encrypts an address change verification message (using the received encryption key) that the financial services application sends 476 to the secure device 704 (via the API 730 to the cyber deadbolt system 706). The authentication application on the secure device 704 receives the encrypted message, and decrypts the message using the same encryption key that the financial services application 716 received from the cyber deadbolt system 706 to encrypt the message. The authentication application on the secure device 704 securely displays 748 in the trusted environment configured for the secure device 704 the changed address and requests 748 verification from the user 702. Once the user responds by verifying or not verifying the address change, the secure device 704 verifies whether the PIN of the secure device 704 matches the PIN stored at the cyber deadbolt system 706 for the secure device 704. If the PINs match, the secured device 704 returns 750 the verification of the address change (Yes/No) to the cyber deadbolt system 706 (over the out-of-band channel connection), which, in turn, the cyber deadbolt system 706 returns 752 the address change verification to the financial service application 716 (via the API 730). The financial services application 716 updates the address change at the user's financial account based on the returned address change verification.

While this invention has been particularly shown and described with references to example embodiments thereof, it will be understood by those skilled in the art that various changes in form and details may be made therein without departing from the scope of the invention encompassed by the appended claims. While specific example onboarding and authentication processes are described herein, those of ordinary skill in the field of trusted computing will appreciate that such processes are exemplary and similar processes are applicable and encompassed by the appended claims.

APPENDIX A

```
var deadbolt=fl;
/* Default timeout in seconds */deadbolt.default
timeout=3000;
/**
* The function generates QR code for the account
cyberdeadbolt is enabled for
* @param clientId—the unique clientId that deadbolt cre-
ates for each client.
* @param clientName—Name of the client
* @param callback (status, object)—user registered call-
back.
* @param apiKey—The unique apiKey given to the client
for communicating
*with deadbolt servers.
*/deadbolt.generateQR=function(clientId,    clientName,
apiKey, callback){
    /*
    1. First the function creates a unique pairingId and using
       the clientId and clientName.
    2. Generates a QR (Quick Response) code using the
       generated pairingId, clientId, clientName for a user to
       scan and pair with deadbolt account.
    3. After the scan is successful the generatedId pairingId is
       returned to the callback function.
    /**
};
* The function subscribes to deadbolt notification server.
* @param type—clientId
* @param apiKey—The unique apiKey given to the client
for communicating
* with deadbolt servers.
*/deadbolt.subscribe=function(clientId, apiKey) {
    /*
    * The client application that hosts the plugin, is automati-
      cally
    * subscribed to deadbolt notification server to listen to
      lock/unlock
    * events that are emitted by deadbolt notification server.
    * Retrieves the account status (i.e. lock or unlock) to be
      updated
    * from the captured event emitted by deadbolt notification
      server.
    * The updateAccountStatus( ) function is called to update
      the status
    * of the paired account in the client database.
    */};
/**
* The function publishes paired account metadata informa-
tion to deadbolt.
* @param type—clientId
* @param apiKey—The unique apiKey given to the client
for communicating with deadbolt servers.
* @param callback (status, object)—user registered call-
back.
*/
*/deadbolt.publish=function(clientId,  pairingId,  apiKey,
account metadata, callback) {
    /*
    * The client application publishes appropriate and rel-
      evant
    * information about a paired account
    * (ex: data & time every time a paired account is accessed,
      whether
    * login was successful or not etc.)
    *
    */
};
/*
* The function updates the status for the paired account in
client database.
* @param pairingId—clientId
* @param status—The unique apiKey given to the client
for communicating
* with deadbolt servers.
* @param callback (status, object)—user registered call-
back.
*/
deadbolt.updateAccountStatus=function(pairingId,   sta-
tus, callback){ };
```

What is claimed is:

1. A computer-implemented method for changing the lock status of a user account for a client application, the computer-implemented method comprising:

accessing a user authentication account via an authentication application configured on a user device, the user device communicatively coupled to the authentication server, and the user authentication account containing a pairing to the user account for the client application, wherein performing the pairing comprises:

generating identification information for the client application, the identification information saved at both the client application and the authentication server configured to manage the user authentication account;

selecting an option at the client application for enabling pairing of the user account for the client application to the user authentication account;

generating a pairing code in response to selecting the option, the pairing code comprising at least a client identifier, client name, and unique pairing identifier for the user account;

accessing the user authentication account via the authentication application configured on the user device;

selecting a pairing option through the authentication application, the pairing option authenticating the selector as a registered user of the user authentication account;

in response to authenticating the user, enabling the user to provide the pairing code to the authentication application, wherein the authentication application validates the client information contained in the pairing code against the identification information for the client application saved at the authentication server; and in response to validating the user, sending the information contained in the pairing code to the authentication server to be stored in the user authentication account, wherein the pairing code information is linked to the saved identification information for the client application;

selecting the pairing and an option to change the status of the pairing via the authentication application;

in response to selection of the pairing, authenticating the selector as a registered user of the user authentication account;

in response to authenticating the user, sending a request to the authentication server with a pairing code for the pairing and the changed lock status;

transmitting, by the authentication server, an event to the client application identified in the pairing code, the event being received by the client application and the changed lock status saved at the client application for the pairing identified in the event; and determining login access to the paired user account by the client application based on the saved lock status stored at the client application.

2. The computer-implemented method of claim 1, wherein pairing to the user account, receiving the transmitted event, and saving the changed lock status is performed by an application programming interface (API) installed at the client application, the installed API communicatively coupled to the authentication server.

3. The computer-implemented method of claim 1, wherein the client application is at least one of an online: service provider, wireless router, security system, wirelessly controlled appliance, and automatic car door.

4. The computer-implemented method of claim 1, wherein communication between the user device and the client application and between the authentication server and the user device is over a distributed peer-to-peer decentralized network.

5. The computer-implemented method of claim 1, wherein communication between the user device and the authentication server and between the client application and the authentication server is in a trusted execution environment.

6. The computer-implemented method of claim 1, wherein the authenticating of the selector includes at least one of: comparing voice samples, comparing biometric information, comparing behavioral information, and contacting human authenticators.

7. The computer-implemented method of claim 1, wherein the lock status is one of locked or unlocked.

8. The computer-implemented method of claim 1, wherein the pairing code is a quick response (QR) code, and wherein the user scans the pairing code to provide the pairing code to the authentication application.

9. The computer-implemented method of claim 1, further comprising monitoring the login activity of the user account for the client application comprising:

capturing each login attempt to the user account for the client application, the capturing sending collected information related to the captured login attempts to an authentication server;

capturing, at the authentication server, each lock attempt and unlock attempt to the login account for the client application through a paired user authentication account;

removing all personal identifiable information from information collected related to the captured login attempts, captured lock attempts, and captured unlock attempts;

generating reports indicating the health of the login account based on the collected information;

automatically changing the lock status for the user account to lock based on the collected information indicating a pattern of failed login attempts; and generating an alert to a computing device of a user of the login account when a cyber-attack on the login account is detected from the collected information.

10. A computer system for changing the lock status of a user account for a client application, the computer system comprising:

a user device configured with an authentication application, the user device configured, via the authentication application, to:

access a user authentication account on an authentication server, and the user authentication account containing a pairing to the user account for the client application, wherein performing the pairing comprises:

configuring the authentication server to manage the user authentication account;

configuring the client application to:

generate identification information for the client application, the identification information saved at both the client application and the authentication server;

enable selecting of an option at the client application for enabling pairing of the user account for the client application to the user authentication account; and generate a pairing code in response to selecting the option, the pairing code comprising at least a client identifier, client name, and unique pairing identifier for the user account; and configuring the user device configured to:

access the user authentication account via the authentication application;

enable selecting of a pairing option via the authentication application, the pairing option authenticating the selector as a registered user of the user authentication account;

in response to authenticating the user, enable the user to provide the pairing code to the authentication application, wherein the authentication application validates the client information contained in the pairing code against the identification information for the client application saved at the authentication server; and in response to validating the user, send the information contained in the pairing code to the authentication server to be stored in the user authentication account, wherein the pairing code information is linked to the saved identification information for the client application;

enable a user to select the pairing and an option to change the status of the pairing via the authentication application;

in response to selection of the pairing, authenticating the selector as a registered user of the user authentication account; and in response to authenticating the user, sending a request to the authentication server with a pairing code for the pairing and the changed lock status;

the authentication server configured to:

receive the pairing code and changed lock status; and transmit an event to the client application identified in the pairing code identifying the changed lock status the client application configured to:

receive the event and the change lock status saved at the client application for the pairing identified in the event; and determine login access to the paired user account based on the saved lock status stored at the client application.

11. The computer system of claim 10, wherein pairing to the user account, receiving the transmitted event, and saving the changed lock status is performed by an application programming interface (API) installed at the client application, the installed API communicatively coupled to the authentication server.

12. The computer system of claim 10, wherein the client application is at least one of an online: service provider, wireless router, security system, wirelessly controlled appliance, and automatic car door.

13. The computer system of claim 10, wherein communication between the user device and the client application and between the authentication server and the user device is over a distributed peer-to-peer decentralized network.

14. The computer system of claim 10, wherein communication between the user device and the authentication server and between the client application and the authentication server is in a trusted execution environment.

15. The computer system of claim 10, wherein the authenticating of the selector includes at least one of: comparing voice samples, comparing biometric information, comparing behavioral information, and contacting human authenticators.

16. The computer system of claim 10, wherein the lock status is one of locked or unlocked.

17. The computer system of claim 10, wherein the pairing code is a quick response (QR) code, and wherein the user scans the pairing code to provide the pairing code to the authentication application.

18. The computer system of claim 10 further configured to monitor the login activity of the user account for the client application by:

the client application configured to capture each login attempt to a login account for the client application, the capturing sending collected information related to the captured login attempts to the authentication server;

the authentication server configured to:

capture each lock attempt and unlock attempt to the login account for the client application through a paired user authentication account;

remove all personal identifiable information from information collected related to the captured login attempts, captured lock attempts, and captured unlock attempts;

generate reports indicating the health of the login account based on the collected information;

automatically changing the lock status for the user account to lock based on the collected information indicating a pattern of failed login attempts; and generating an alert to the computing device of a user of the login account, when a cyber-attack on the login account is detected from the collected information.

* * * * *